(12) United States Patent
Senda et al.

(10) Patent No.: US 11,072,702 B2
(45) Date of Patent: Jul. 27, 2021

(54) HYDROGENATED BLOCK COPOLYMER, VIBRATION DAMPER, SOUND INSULATOR, INTERLAYER FOR LAMINATED GLASS, DAM RUBBER, SHOE SOLE MATERIAL, FLOORING MATERIAL, LAMINATE, AND LAMINATED GLASS

(71) Applicant: KURARAY CO., LTD., Kurashiki (JP)

(72) Inventors: Yasushi Senda, Kamisu (JP); Shinya Oshita, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 31 days.

(21) Appl. No.: 16/301,592

(22) PCT Filed: May 17, 2017

(86) PCT No.: PCT/JP2017/018444
§ 371 (c)(1),
(2) Date: Nov. 14, 2018

(87) PCT Pub. No.: WO2017/199983
PCT Pub. Date: Nov. 23, 2017

(65) Prior Publication Data
US 2019/0218389 A1    Jul. 18, 2019

(30) Foreign Application Priority Data

May 18, 2016 (JP) .............................. JP2016-100000
Dec. 19, 2016 (JP) .............................. JP2016-245931

(51) Int. Cl.
*C08L 53/02* (2006.01)
*B32B 17/10* (2006.01)
(Continued)

(52) U.S. Cl.
CPC ...... *C08L 53/025* (2013.01); *B32B 17/10743* (2013.01); *B32B 17/10761* (2013.01);
(Continued)

(58) Field of Classification Search
CPC ........................... C08F 297/046; C08F 297/04
See application file for complete search history.

(56) References Cited

U.S. PATENT DOCUMENTS

| | | | | |
|---|---|---|---|---|
| 5,223,579 A | * | 6/1993 | Rhodes | ..................... C08F 8/04 |
| | | | | 508/591 |
| 2012/0204940 A1 | * | 8/2012 | Asanuma | ................ B32B 27/30 |
| | | | | 136/252 |

(Continued)

FOREIGN PATENT DOCUMENTS

| CN | 102585453 A | 7/2012 |
|---|---|---|
| CN | 103333451 A | 10/2013 |

(Continued)

OTHER PUBLICATIONS

Feng et al. Polymer, 9, 494 (Year: 2017).*

(Continued)

*Primary Examiner* — Mark S Kaucher
(74) *Attorney, Agent, or Firm* — Oblon, McClelland, Maier & Neustadt, L.L.P.

(57) ABSTRACT

Provided is a hydrogenated block copolymer, which is a hydrogenation product of a block copolymer including a polymer block (A) containing more than 70 mol % of a structural unit derived from an aromatic vinyl compound and a polymer block (B) containing 30 mol % or more of a structural unit derived from at least one selected from the group consisting of a conjugated diene compound and isobutylene, the hydrogenated block copolymer being satisfied with the following requirements (1) and (2):

Requirement (1): the content of the polymer block (A) in the block copolymer is 1 to 30% by mass; and Requirement (2): when the polymer block (B) is regarded as having a structure with a hydrogenation rate of 100 mol %, an average value of a methylene chain length of a main chain of the structural unit derived from at least (Continued)

one selected from the group consisting of a conjugated diene compound and isobutylene is 1.0 to 6.0.

8 Claims, 21 Drawing Sheets

(51) Int. Cl.
    *B32B 27/30* (2006.01)
    *C08F 297/04* (2006.01)
    *C08F 8/04* (2006.01)
    *C08F 236/04* (2006.01)
    *C08F 236/06* (2006.01)
    *C08F 236/10* (2006.01)

(52) U.S. Cl.
    CPC ............ *B32B 27/30* (2013.01); *B32B 27/302* (2013.01); *C08F 8/04* (2013.01); *C08F 236/045* (2013.01); *C08F 236/06* (2013.01); *C08F 236/10* (2013.01); *C08F 297/04* (2013.01); *C08L 53/02* (2013.01); *B32B 2307/102* (2013.01); *C08F 2800/10* (2013.01)

(56) References Cited

U.S. PATENT DOCUMENTS

| | | | |
|---|---|---|---|
| 2013/0157069 A1* | 6/2013 | Minamide | B32B 17/10018 428/451 |
| 2014/0170404 A1 | 6/2014 | Wang | |
| 2015/0344684 A1 | 12/2015 | Kusanose et al. | |
| 2017/0042766 A1 | 2/2017 | Nojima et al. | |

FOREIGN PATENT DOCUMENTS

| | | | |
|---|---|---|---|
| CN | 103827157 A | | 5/2014 |
| EP | 2 610 305 A1 | | 7/2013 |
| JP | 8-157547 A | | 6/1996 |
| JP | 2000-219781 A | | 8/2000 |
| JP | 2003-192867 A | | 7/2003 |
| JP | 2007-91491 A | | 4/2007 |
| JP | 2008-45034 A | | 2/2008 |
| JP | 2008045034 A | * | 2/2008 |
| JP | 2009-256128 A | | 11/2009 |
| JP | 2012-6406 A | | 1/2012 |
| JP | 2016-108224 A | | 6/2016 |
| WO | WO 2005/018969 A1 | | 3/2005 |
| WO | WO 2014/002984 A1 | | 1/2014 |
| WO | WO 2016/039257 A1 | | 3/2016 |
| WO | WO 2016-039257 A1 | | 3/2016 |
| WO | WO 2016/136760 A1 | | 9/2016 |

OTHER PUBLICATIONS

Extended European Search Report dated Jan. 10, 2020 in corresponding European Patent Application No. 17799407.6, 7 pages.
International Search Report dated Aug. 15, 2017, in PCT/JP2017/018444, filed May 17, 2017.
Combined Taiwanese Office Action and Search Report dated Oct. 22, 2020 in corresponding Taiwanese Patent Application No. 106116412 (with English Translation of Category of Cited Documents), 8 pages.

* cited by examiner

[Fig. 1]
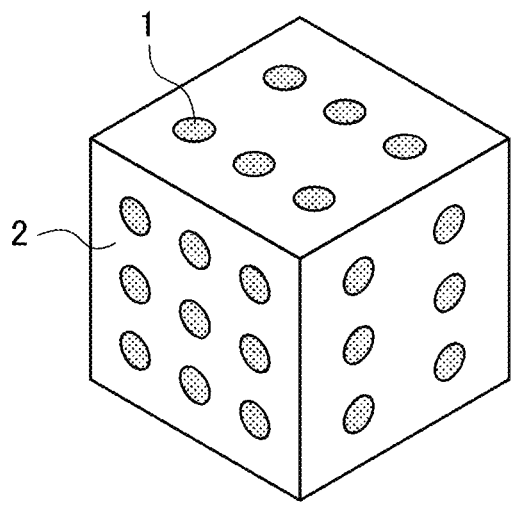
[Fig. 2]
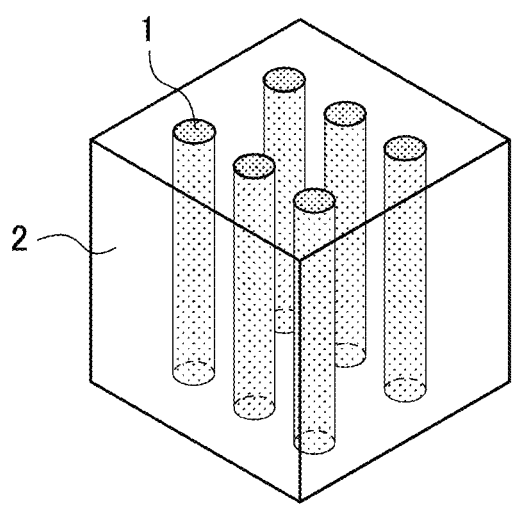
[Fig. 3]
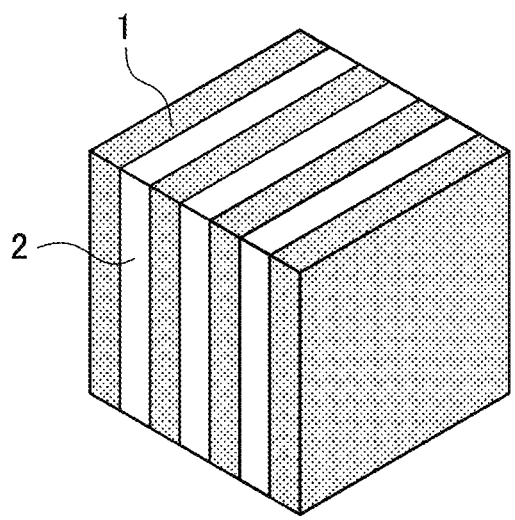

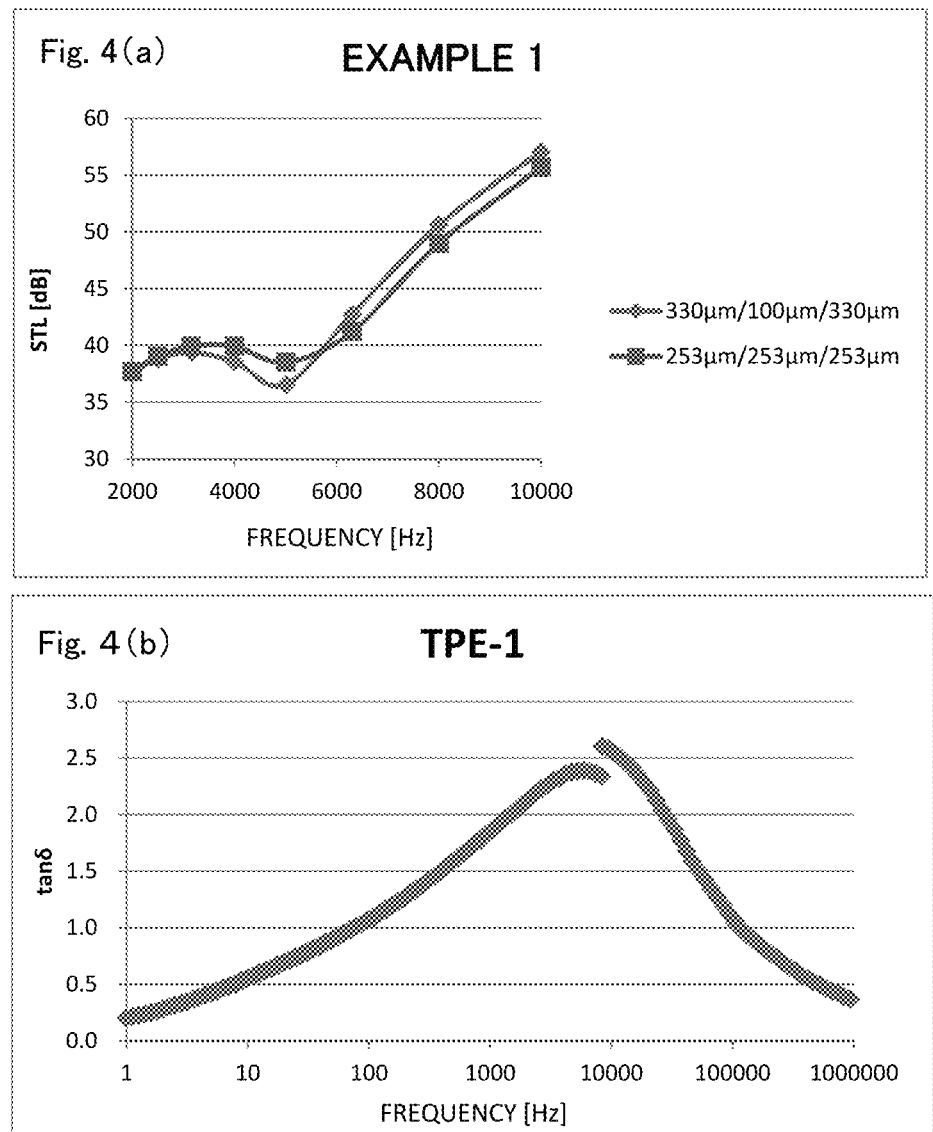
[Fig. 4]

[Fig. 5]
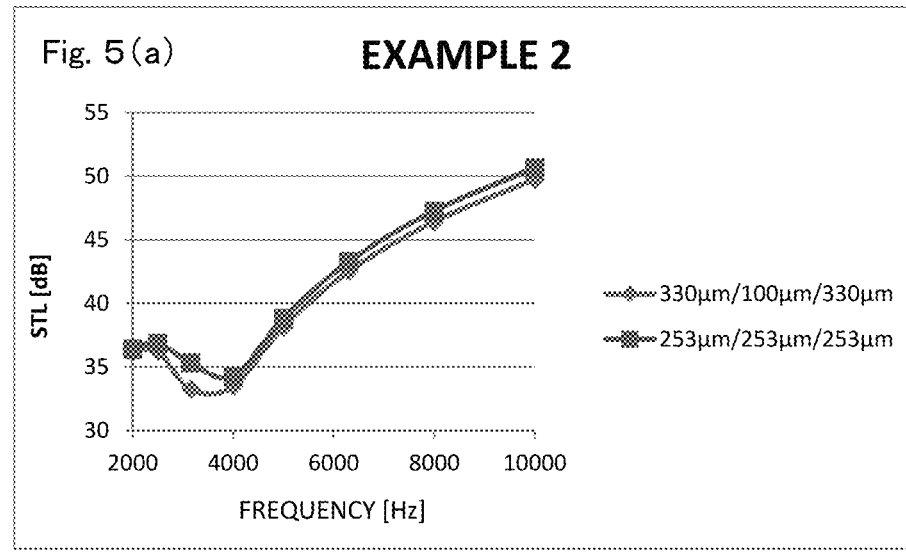
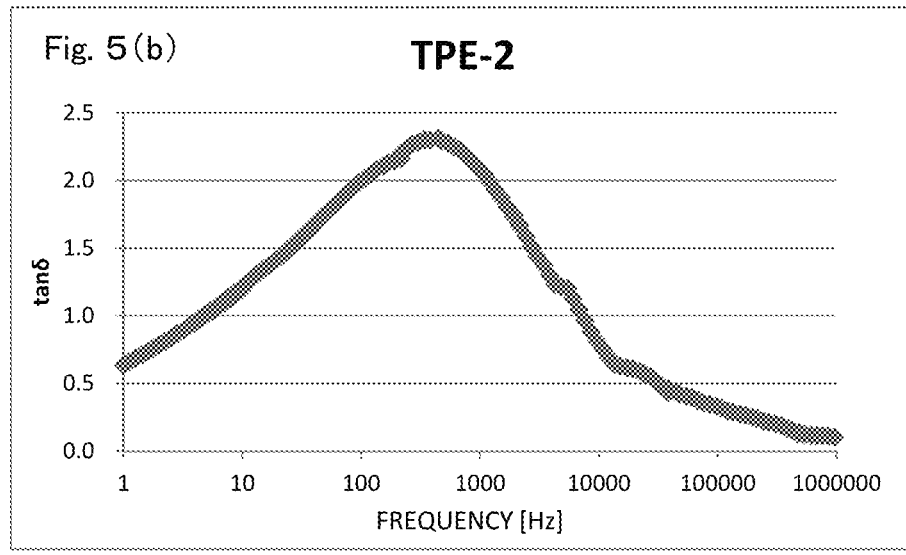

[Fig. 6]
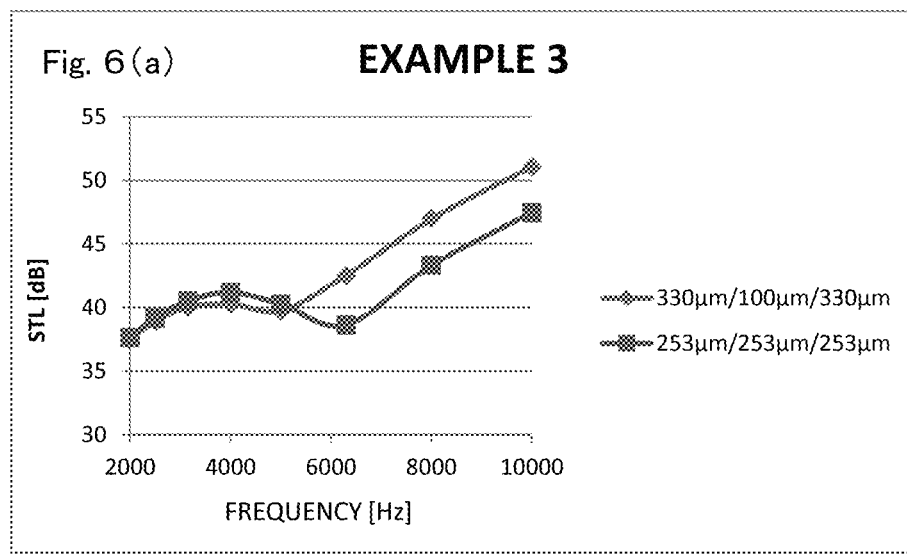
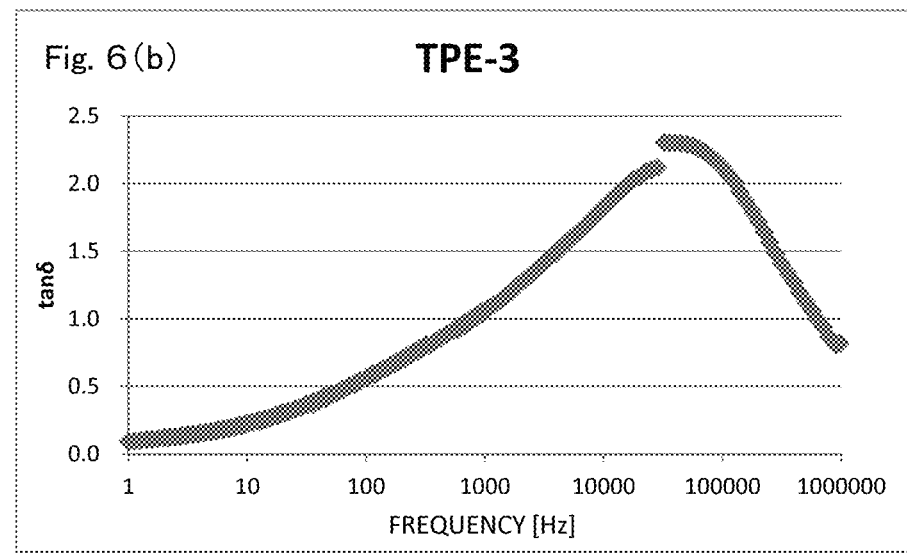

[Fig. 7]
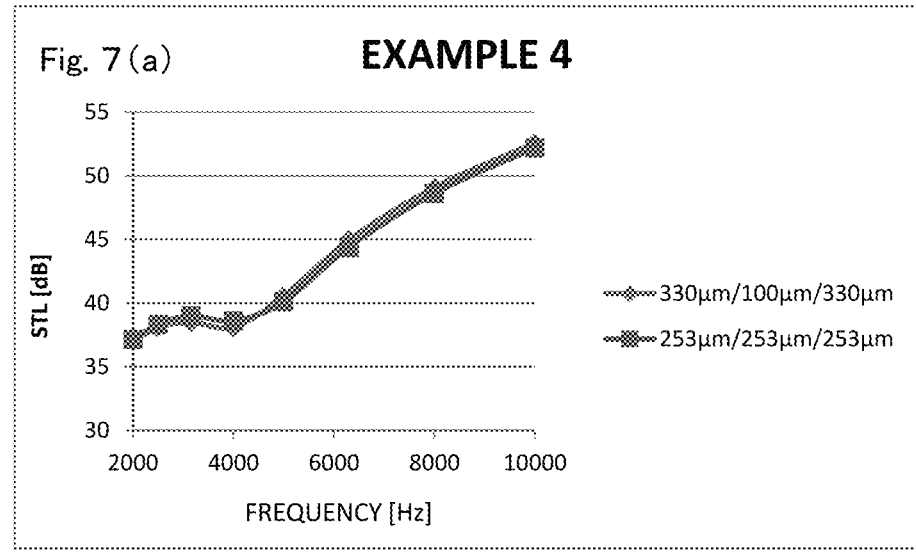
Fig. 7(a) EXAMPLE 4
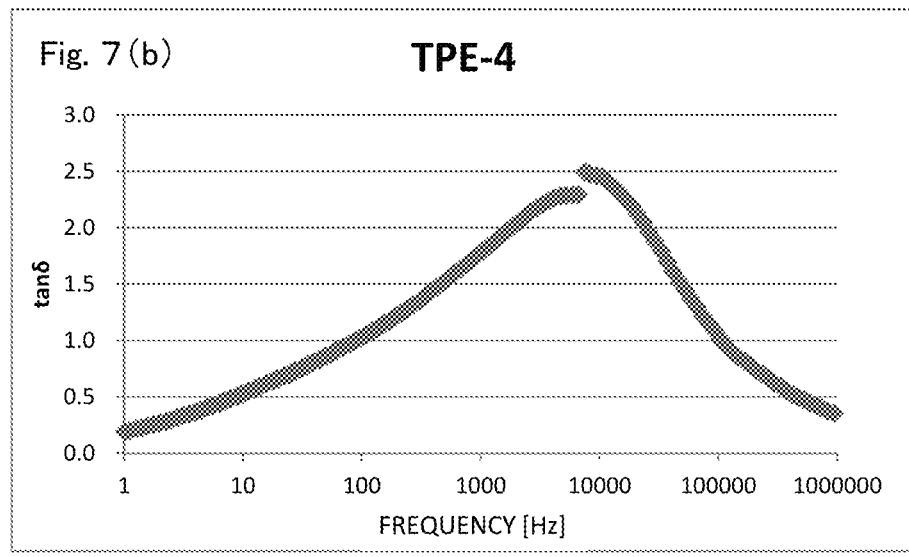
Fig. 7(b) TPE-4

[Fig. 8]
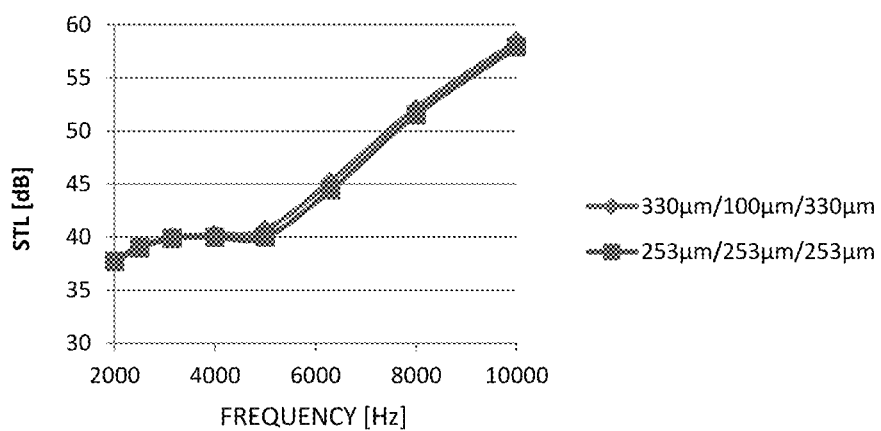
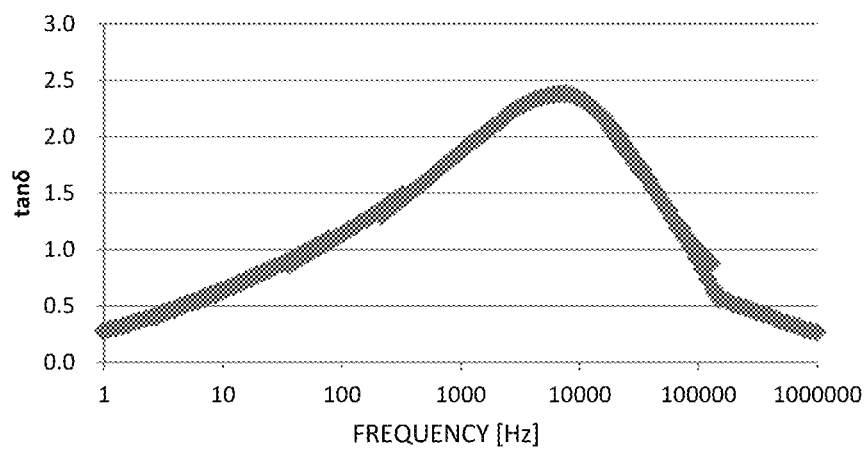

[Fig. 9]
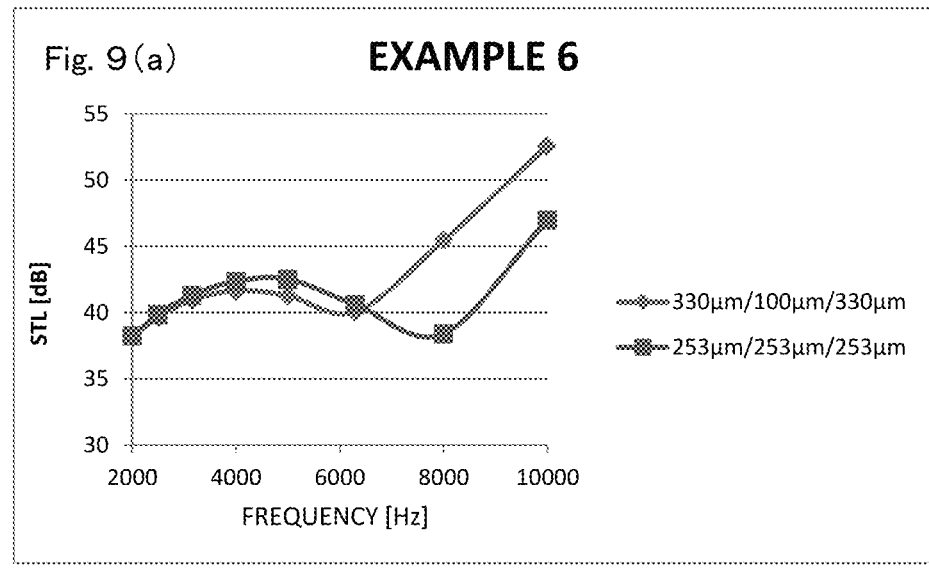
Fig. 9(a) EXAMPLE 6
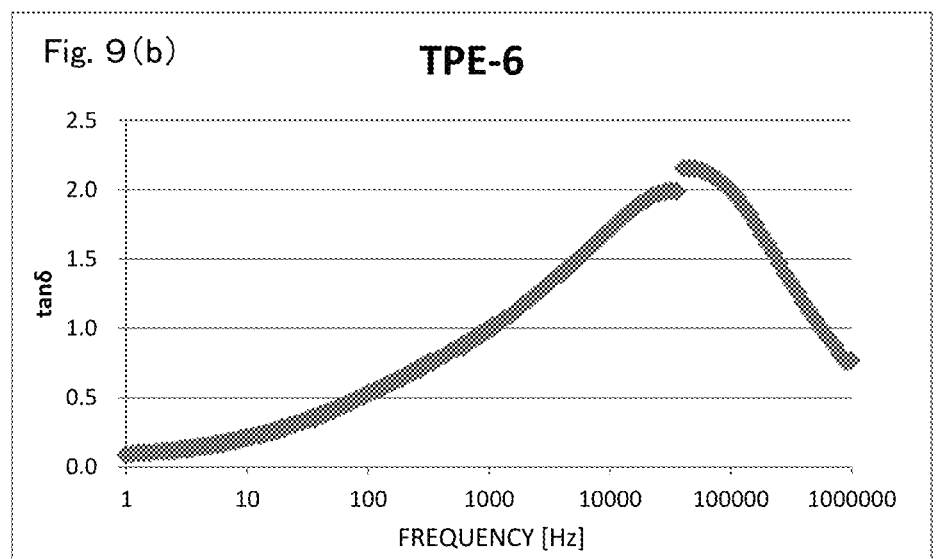
Fig. 9(b) TPE-6

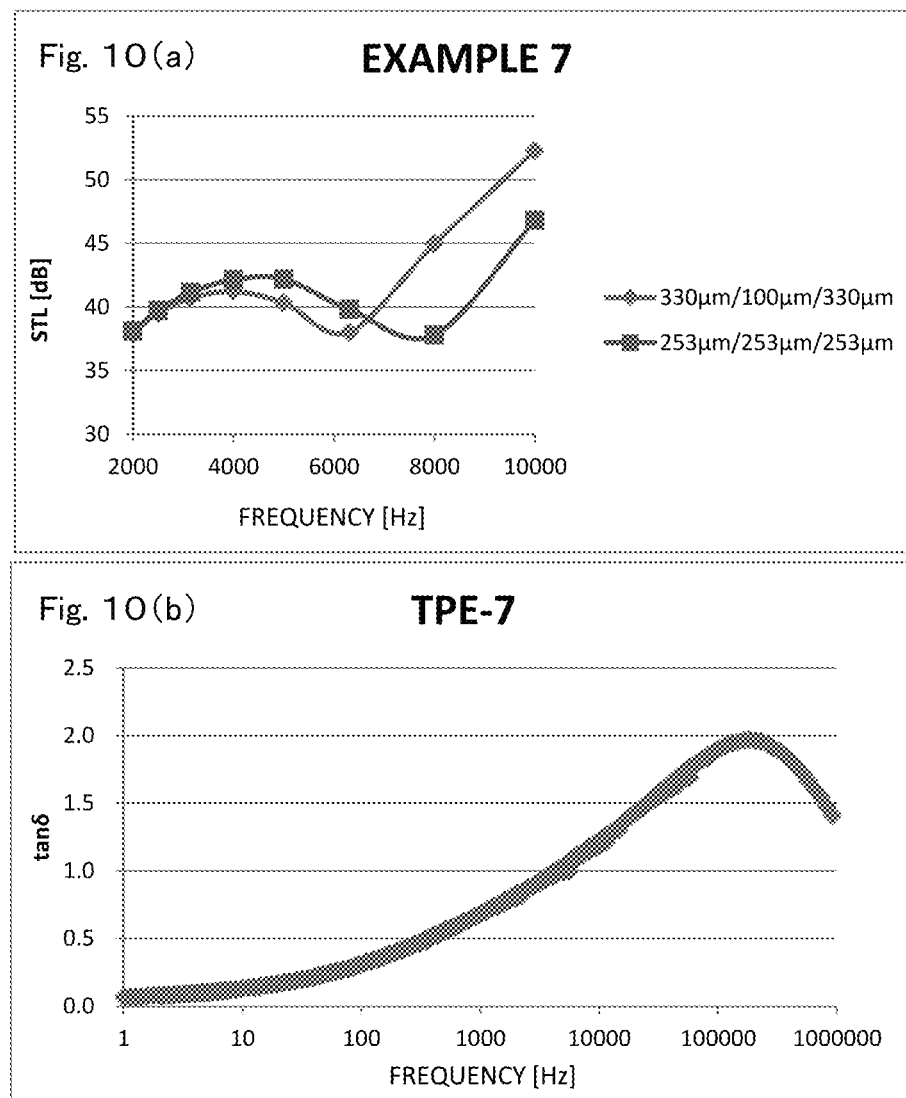

[Fig. 11]
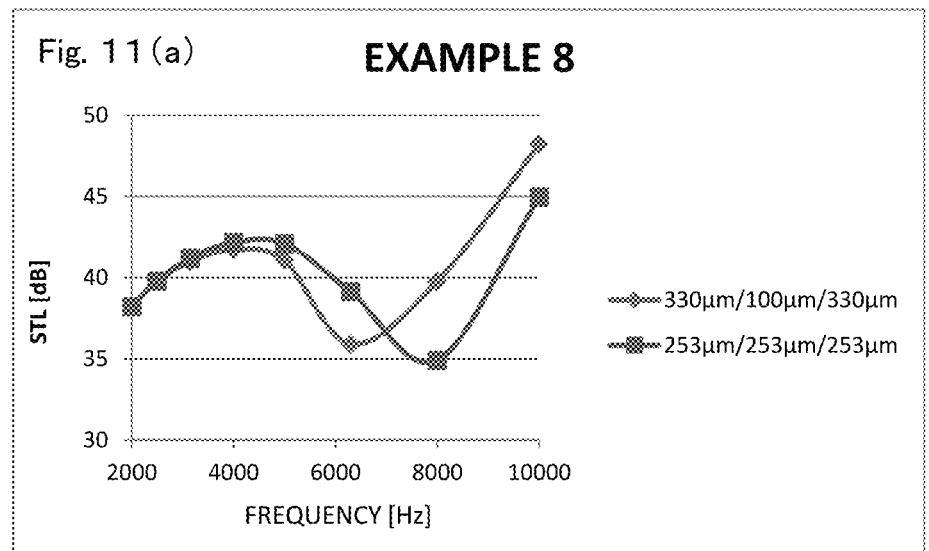
Fig. 11(a) EXAMPLE 8
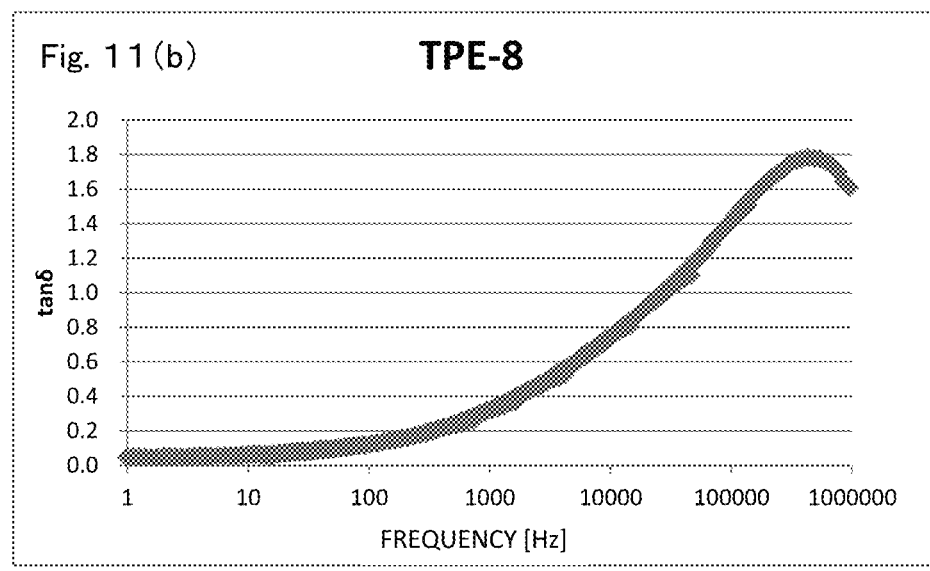
Fig. 11(b) TPE-8

[Fig. 12]
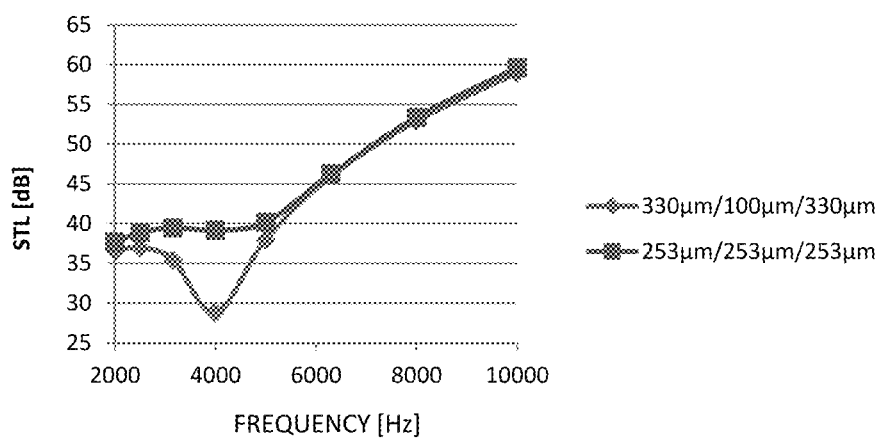
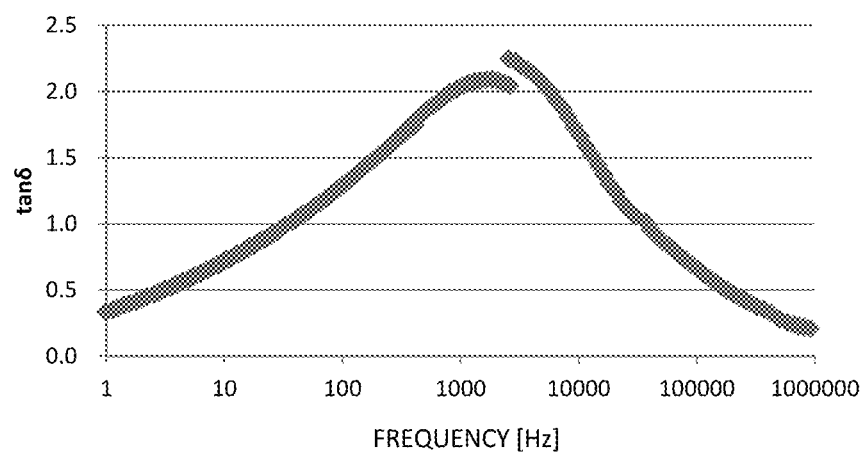

[Fig. 13]
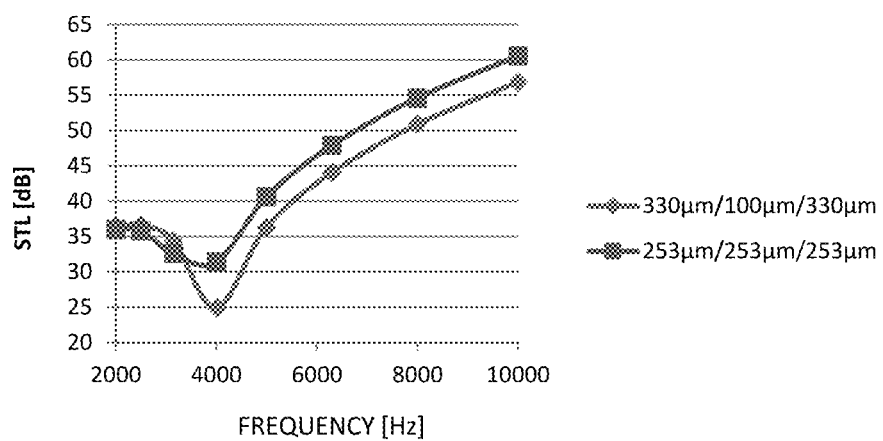
Fig. 13(a) EXAMPLE 10
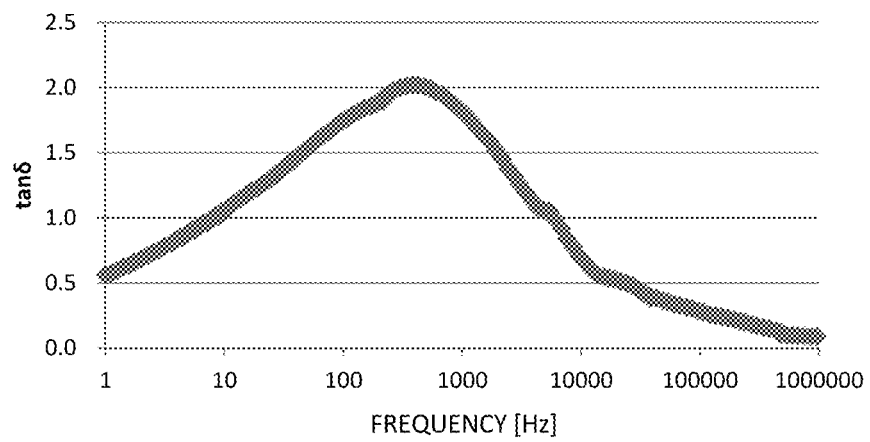
Fig. 13(b) TPE-10

[Fig. 14]
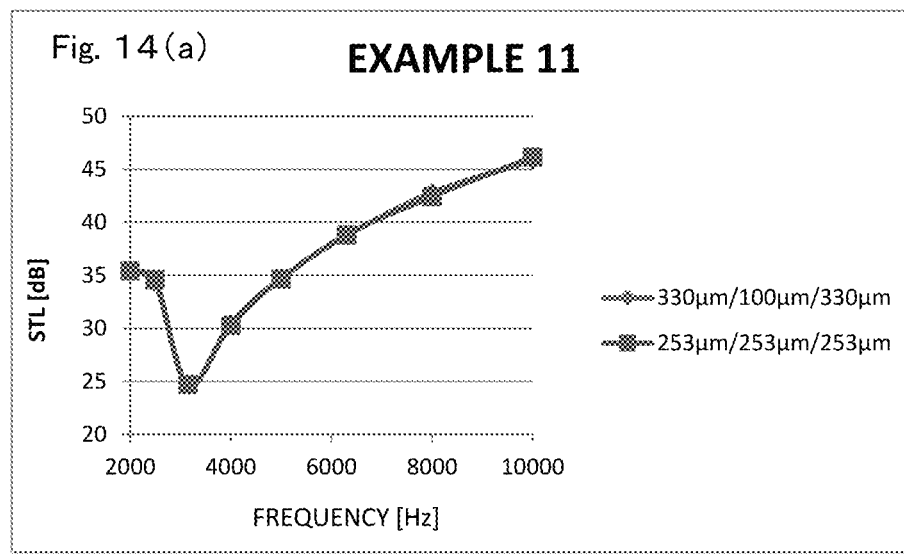
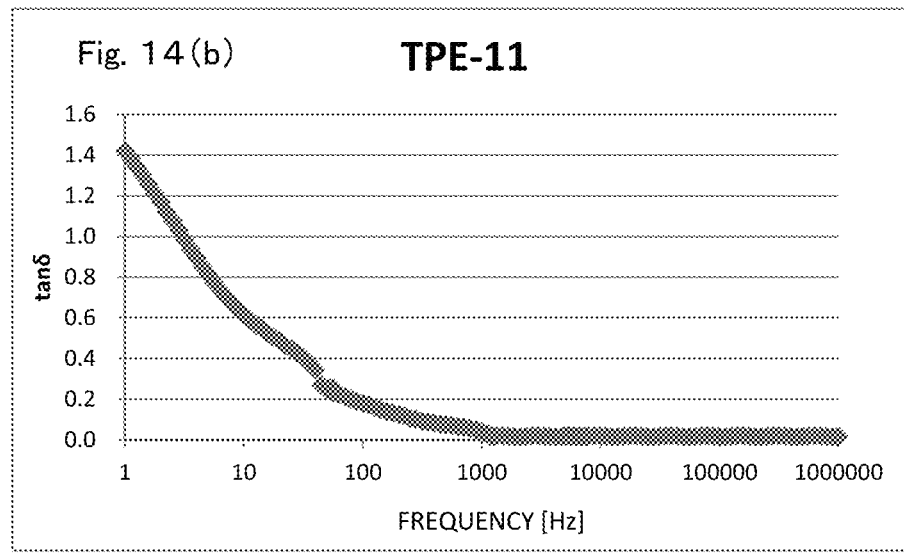

[Fig. 15]
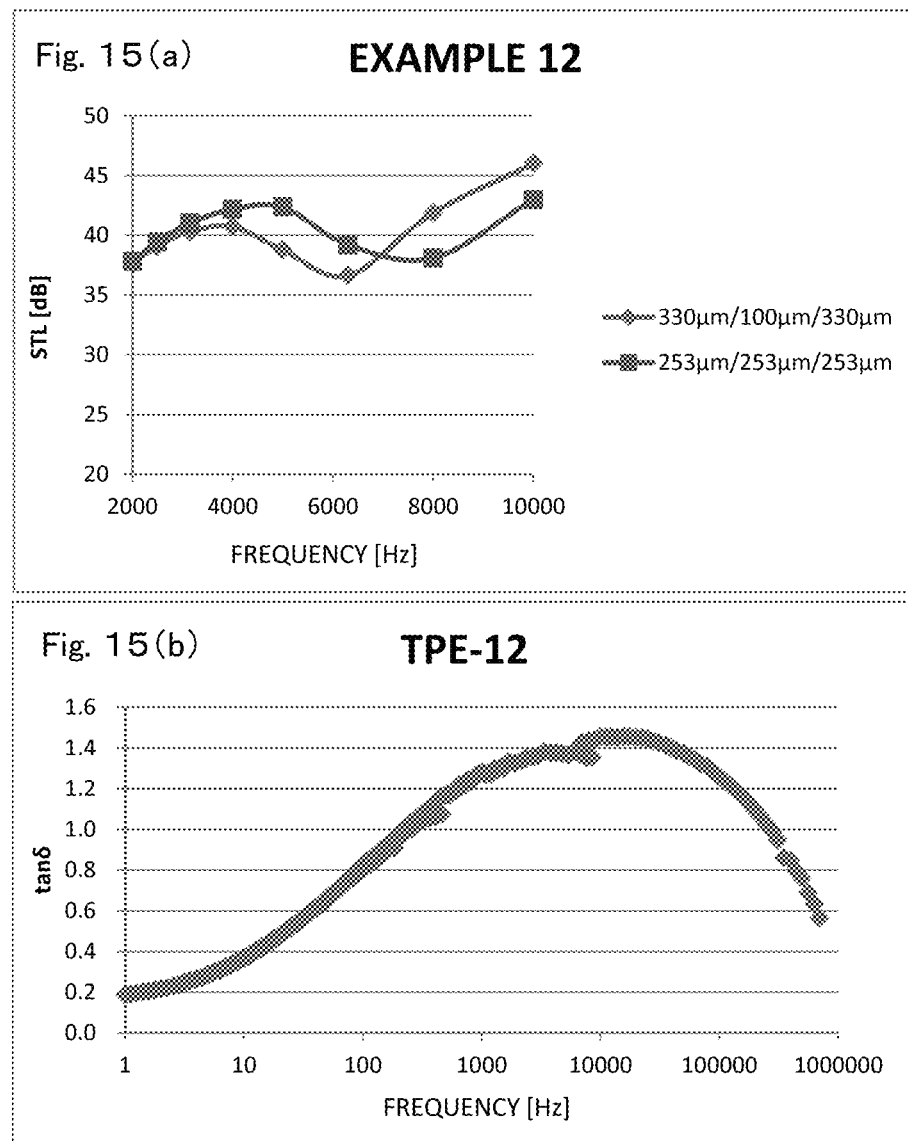

[Fig. 16]
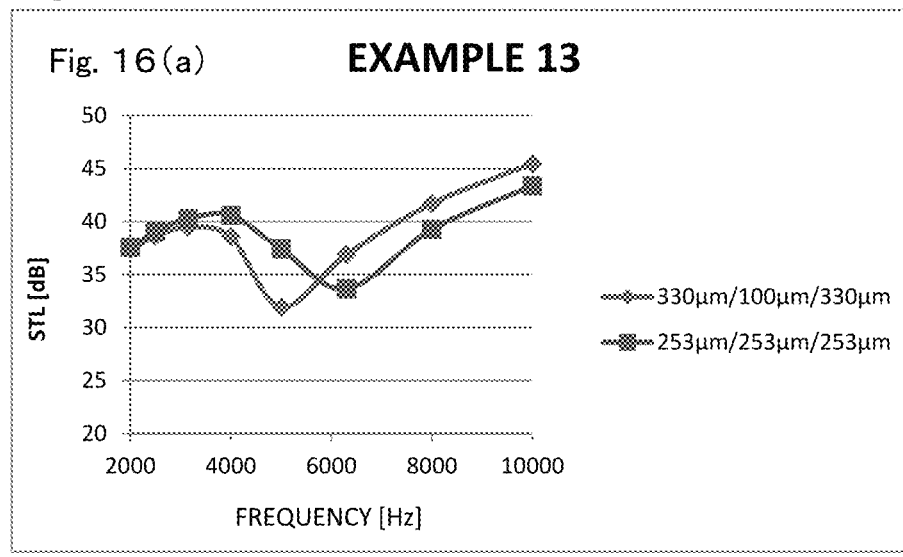
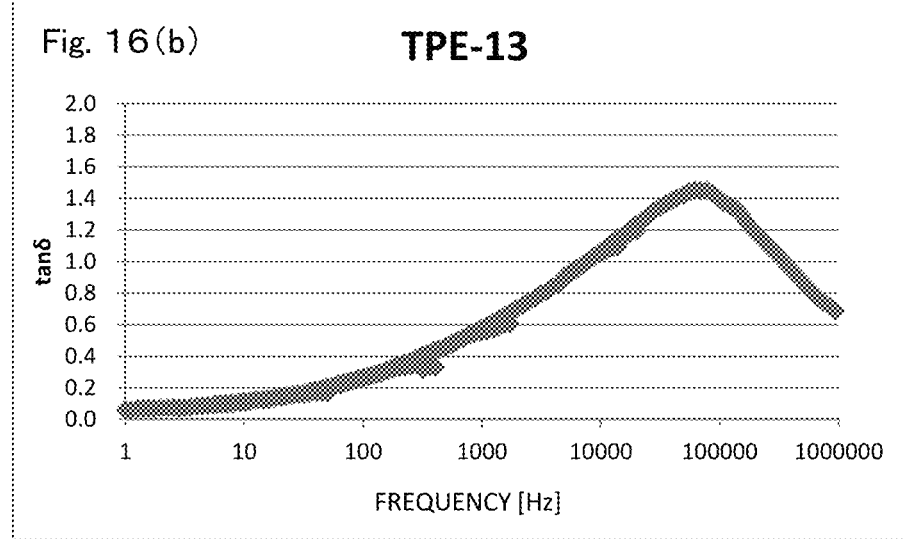

[Fig. 17]
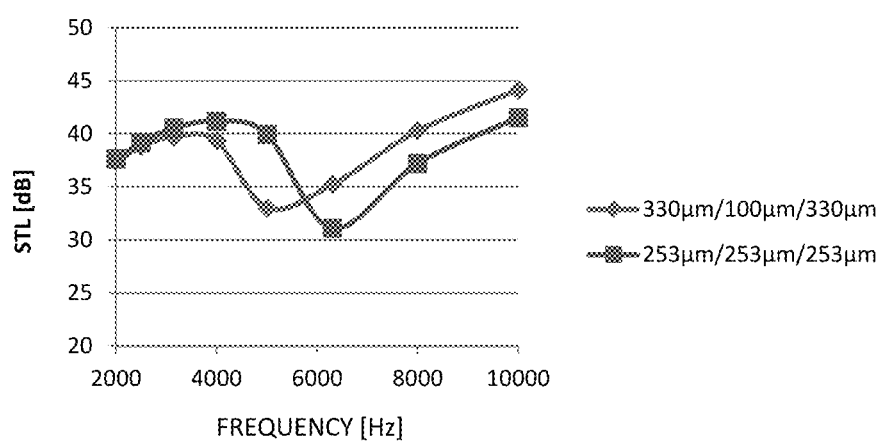
Fig. 17(a) EXAMPLE 14
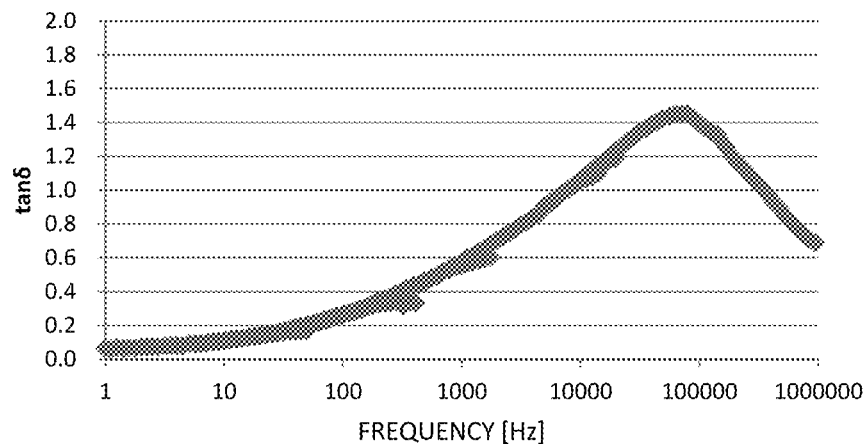
Fig. 17(b) TPE-14

[Fig. 18]
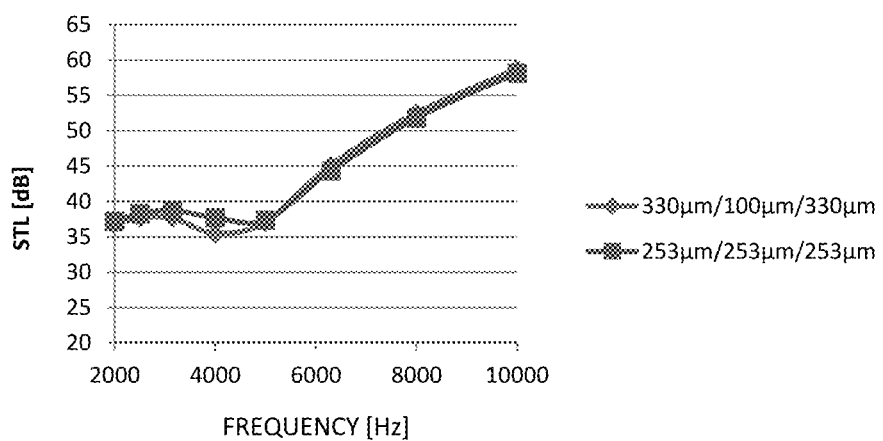
Fig. 18(a) EXAMPLE 15
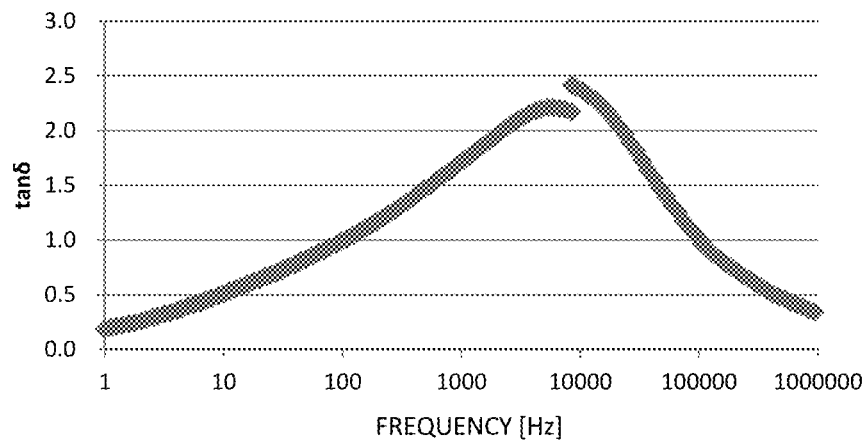
Fig. 18(b) TPE-15

[Fig. 19]
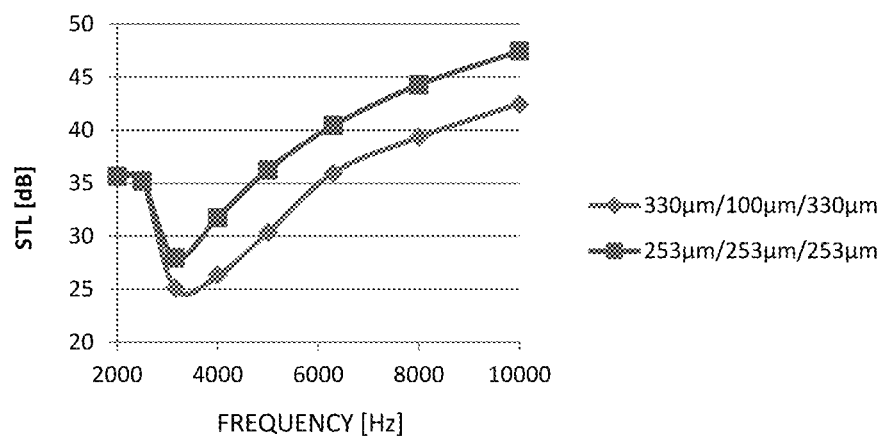
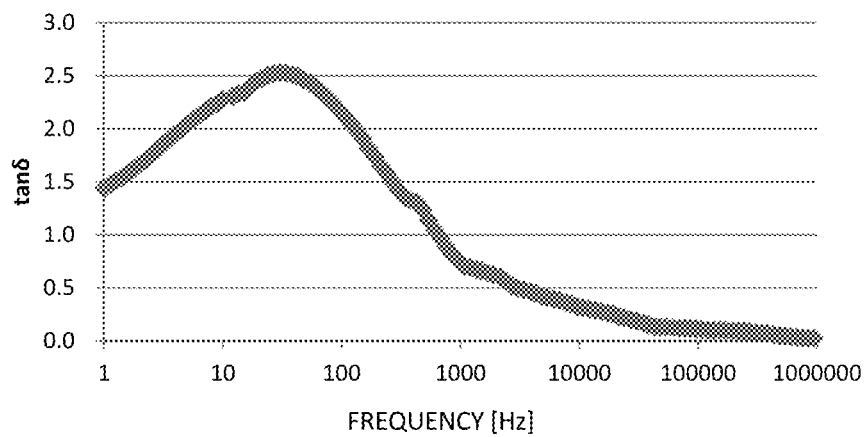

[Fig. 20]
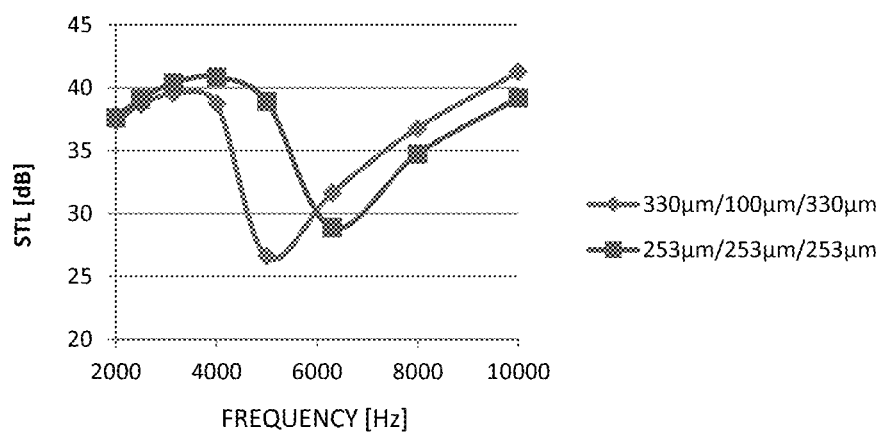
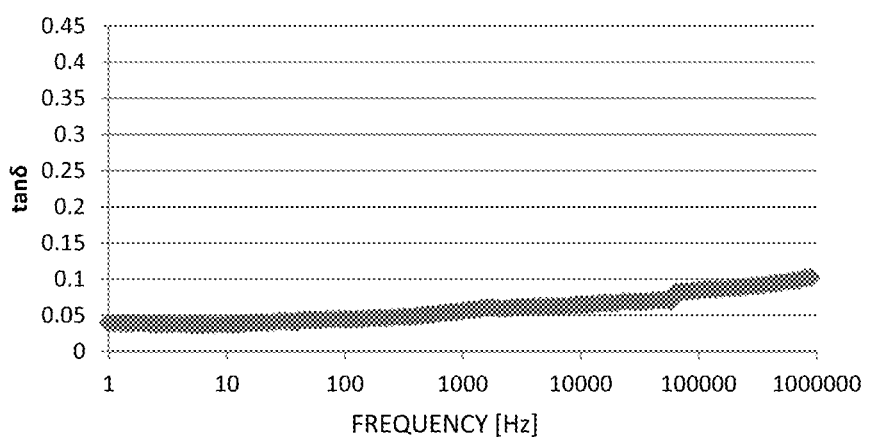

[Fig. 21]
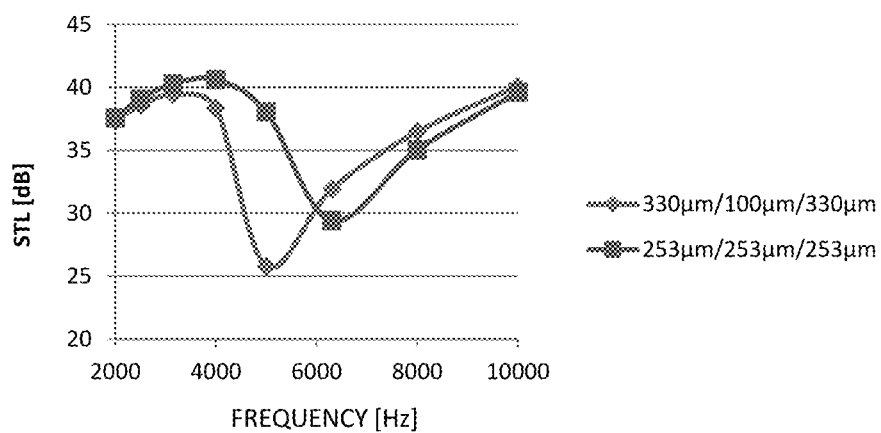
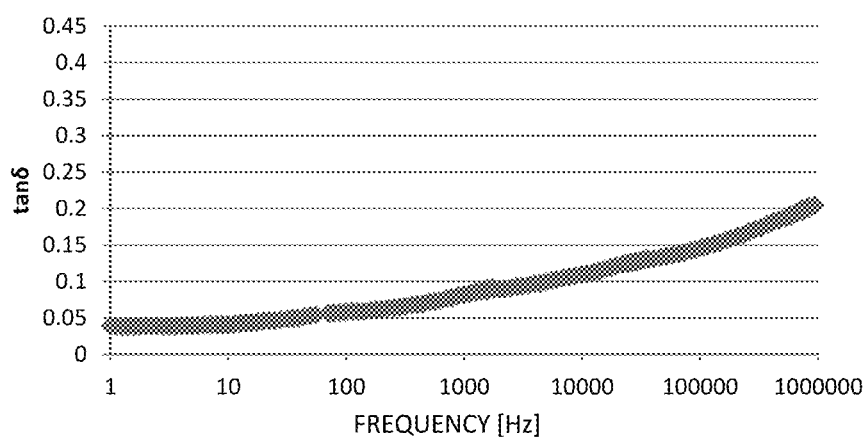

[Fig. 22]
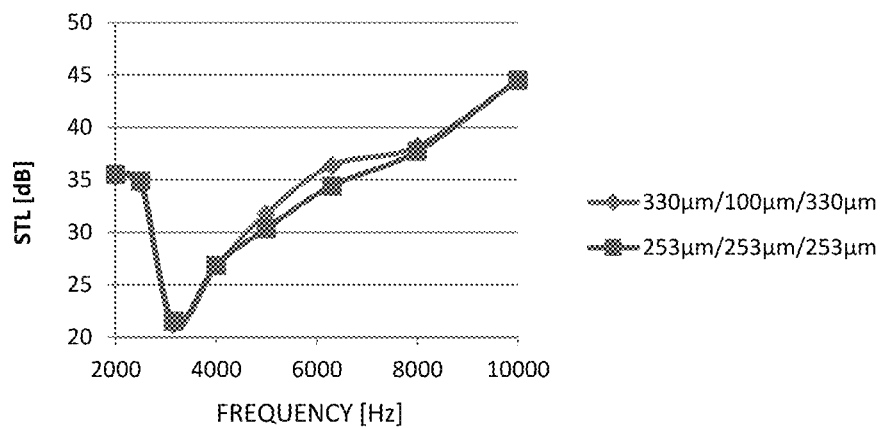
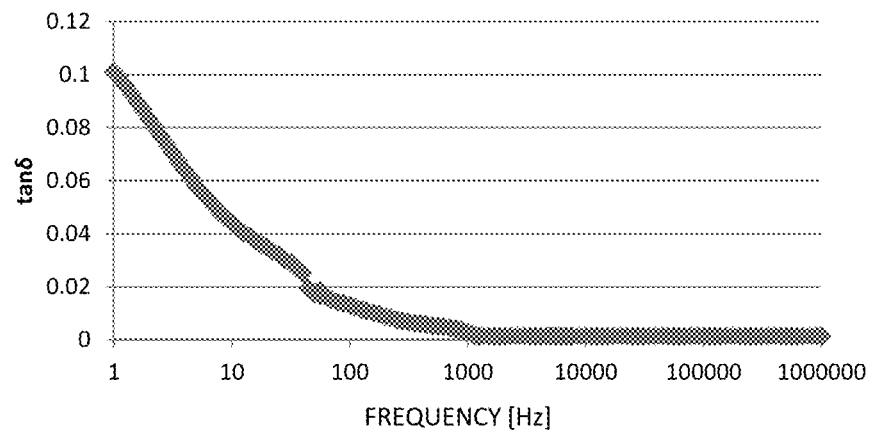

[Fig. 23]
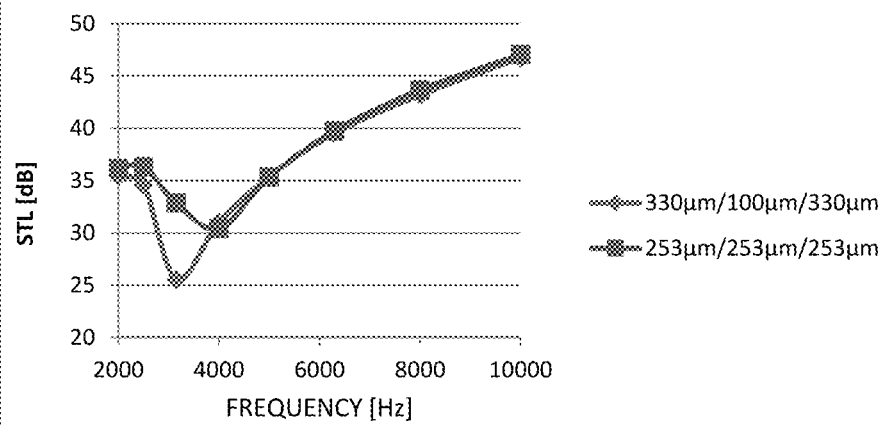
Fig. 23(a) COMPARATIVE EXAMPLE 5
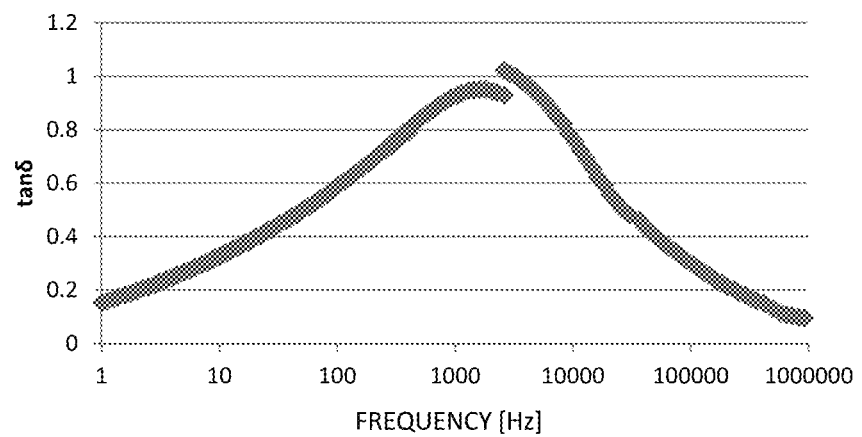
Fig. 23(b) TPE-5'

HYDROGENATED BLOCK COPOLYMER, VIBRATION DAMPER, SOUND INSULATOR, INTERLAYER FOR LAMINATED GLASS, DAM RUBBER, SHOE SOLE MATERIAL, FLOORING MATERIAL, LAMINATE, AND LAMINATED GLASS

TECHNICAL FIELD

The present invention relates to a hydrogenated block copolymer, a vibration damping material, a sound insulator, an intermediate film for laminated glass, a dam rubber, a shoe sole material, a flooring material, a laminate, and a laminated glass.

BACKGROUND ART

Hitherto, in the case of executing a glass in a place where sound insulation is required, such as a window, there has been adopted a method in which the thickness of glass is made thick to enhance a sound insulation effect due to the weight, or a method in which a sound insulation effect is enhanced by using a laminated glass obtained by laminating two or more glass sheets and an intermediate film. According to the latter method using an intermediate film, the sound insulation properties of glass are improved by a damping performance of the intermediate film and a performance of the intermediate film for converting vibration energy into thermal energy.

As for the method of improving the sound insulation properties, an intermediate film in which a copolymer of polystyrene and a rubber-based resin is laminated by a plasticized polyvinyl acetal-based resin is proposed (see, for example, PTL 1).

In addition, an intermediate film for laminated glass composed of polyvinyl butyral and having certain impact resistance and sound insulation properties and a laminated glass are proposed (see, for example, PTL 2).

Furthermore, in recent years, from the viewpoint of energy saving, an improvement of fuel consumption of an automobile or the like has been becoming a big issue more and more. Examples of the method of improving the fuel consumption of an automobile or the like include a method of controlling the use of an air conditioner; and a method of reducing the weight of an automobile.

Examples of the method of controlling the use of an air conditioner include a method in which a laminated glass with high heat insulation properties capable of controlling a temperature rise within the automobile is used for a window glass of an automobile. Examples of a device of reducing the weight of an automobile include a method of reducing the weight of a window glass or a steel sheet.

In order to reduce the weight of a window glass, it is necessary to make the laminated glass thin. In order to reduce the weight of a steel sheet, there is a method in which the thickness of the sheet is made thin, or the steel is replaced by aluminum or a resin. However, in all of the cases, there is involved such a problem that lightening results in a lowering of the sound insulation properties.

As a method of producing a laminated glass having suitable sound insulation properties, a method in which a layer containing a copolymer of styrene and a rubber-based resin monomer is sandwiched by layers containing a heat adhesive resin to form an intermediate film having a three-layer configuration, and the intermediate film is laminated with two or more sheets of glass to produce a laminated glass (see, for example, PTL 3); and a method in which a laminated glass is produced by using a laminate with improved interlayer adhesiveness, which is obtained by laminating a layer containing a polyvinyl acetal and a layer containing a polyolefin (see, for example, PTL 4) are proposed.

CITATION LIST

Patent Literature

PTL 1: JP 2007-91491 A
PTL 2: WO 2005/018969 A
PTL 3: JP 2009-256128 A
PTL 4: JP 2012-6406 A

SUMMARY OF INVENTION

Technical Problem

But, in all of the background arts, there was involved such a problem that in the case of making the laminated glass thin, the sound insulation properties become insufficient. In addition, in a laminated glass, an adhesive auxiliary layer (also referred to as "skin layer") is frequently provided between the glass and the intermediate film, and therefore, the intermediate film is also required to have low shrinking properties. Furthermore, the intermediate film is required to have transparency, and in view of the matter that a wrinkle to be caused due to shrinkage appears to become uneven is problematic, the intermediate film is required to have low shrinking properties, too.

Then, a problem of the present invention is to provide a hydrogenated block copolymer capable of enhancing the sound insulation properties in laminated glasses of any thickness and to provide a vibration damping material, a sound insulator, an intermediate film for laminated glass with low shrinking properties, a dam rubber, a shoe sole material, a flooring material, a laminate, and a laminated glass, each of which is obtained by using the foregoing hydrogenated block copolymer.

Solution to Problem

In order to solve the aforementioned problem, the present inventors made extensive and intensive investigations. As a result, it has become clear that as a cause that the sound insulation properties become insufficient, a possibility that a relation between a frequency at which a sound transmission loss (STL) is lowered due to a coincidence effect (namely, a phenomenon in which bending vibration of a rigid material, such as a glass, and vibration of incident sonic waves coincidentally cause a resonant state) and a peak frequency of tan δ of a hydrogenated block copolymer gives a large influence is high. Furthermore, it has become clear that by reducing the degree of a lowering of STL per se and increasing a lowest frequency at which the coincidence effect is generated (a so-called coincidence critical frequency), the sound insulation properties in a low frequency region become much more excellent.

Then, by regulating these [(1) the relation between the frequency at which STL is lowered due to the coincidence effect and the peak frequency of tan δ of a hydrogenated block copolymer, (2) a reduction of the degree of a lowering of STL, and (3) an increase of a coincidence critical frequency], the present inventors made the development of a material capable of efficiently enhancing the sound insulation properties even when used for laminated glasses of any thickness. Specifically, it has become clear that the aforementioned problem can be solved by a hydrogenated block copolymer that is a hydrogenation product of a block copolymer including a polymer block (A) containing a predetermined amount of a structural unit derived from an aromatic vinyl compound and a polymer block (B) containing a predetermined amount of a structural unit derived from at least one selected from the group consisting of a conjugated diene compound and isobutylene, the hydrogenated block copolymer being satisfied with specified requirements, thereby leading to the present invention.

The present invention is concerned with the following [1] to [29].

[1] A hydrogenated block copolymer, which is a hydrogenation product of a block copolymer including a polymer block (A) containing more than 70 mol % of a structural unit derived from an aromatic vinyl compound and a polymer block (B) containing 30 mol % or more of a structural unit derived from at least one selected from the group consisting of a conjugated diene compound and isobutylene, the hydrogenated block copolymer being satisfied with the following requirements (1) and (2):

Requirement (1): the content of the polymer block (A) in the block copolymer is from 1 to 30% by mass; and Requirement (2): when the polymer block (B) is regarded as having a structure with a hydrogenation rate of 100 mol %, an average value of a methylene chain length of a main chain of the structural unit derived from at least one selected from the group consisting of a conjugated diene compound and isobutylene is from 1.0 to 6.0.

[2] The hydrogenated block copolymer as set forth in the above [1], wherein the hydrogenation rate in the polymer block (B) is from 80 to 99 mol %.

[3] The hydrogenated block copolymer as set forth in the above [1] or [2], wherein when the polymer block (B) is regarded as having a structure with a hydrogenation rate of 100 mol %, an average value of a substituent constant (v) of a side chain which the main chain has per ethylene unit is from 0.25 to 1.1.

[4] The hydrogenated block copolymer as set forth in any of the above [1] to [31], wherein when the polymer block (B) is regarded as having a structure with a hydrogenation rate of 100 mol %, an average value of a substituent constant (v) of a side chain which the main chain has per ethylene unit is from 0.30 to 0.55.

[5] The hydrogenated block copolymer as set forth in any of the above [1] to [4], wherein the conjugated diene compound is isoprene, butadiene, or a mixture of isoprene and butadiene.

[6] The hydrogenated block copolymer as set forth in any of the above [1] to [5], wherein the conjugated diene compound is isoprene.

[7] The hydrogenated block copolymer as set forth in any of the above [1] to [6], wherein in the requirement (1), the content of the polymer block (A) in the block copolymer is from 3.5 to 4.5% by mass.

[8] The hydrogenated block copolymer as set forth in any of the above [1] to [7], wherein in the requirement (2), an average value of a methylene chain length of a main chain of the structural unit derived from the conjugated diene compound is from 1.5 to 3.0.

[9] The hydrogenated block copolymer as set forth in any of the above [1] to [8], which exhibits a peak top intensity of tan δ, as measured under a condition at a strain amount of 0.1%, a frequency of 1 Hz, a measurement temperature of −70 to 200° C., and a temperature rise rate of 3° C./min in conformity of JIS K7244-10 (2005), of 0.5 or more.

[10] The hydrogenated block copolymer as set forth in any of the above [1] to [9], wherein a morphology of a film having a thickness of 1 mm, which is obtained by molding the copolymer under the following molding condition, has a microphase-separated structure of a sphere or cylinder:

Molding condition: to apply a pressure at a temperature of 230° C. under a pressure of 10 MPa for 3 minutes.

[11] The hydrogenated block copolymer as set forth in any of the above [1] to [10], wherein a morphology of a film having a thickness of 1 mm, which is obtained by molding the copolymer under the following molding condition, has a microphase-separated structure of a sphere:

Molding condition: to apply a pressure at a temperature of 230° C. under a pressure of 10 MPa for 3 minutes.

[12] The hydrogenated block copolymer as set forth in any of the above [1] to [11], wherein a shrinkage factor in the MD direction as defined below is 15% or less:

Shrinkage factor in the MD direction: after stationarily placing a ribbon sheet (MD/TD=4.0 cm/3.5 cm, 1 mm) obtained by extrusion molding the copolymer under an unstretched condition at 230° C. on talc at 230° C. for one week, when the length in the MD direction is taken as y, and an initial length (4.0 cm) in the MD direction is taken as x, the shrinkage factor in the MD direction is defined as $\{(x-y)/x\} \times 100(\%)$.

[13] A vibration damping material containing the hydrogenated block copolymer as set forth in any of the above [1] to [12].

[14] A sound insulator containing the hydrogenated block copolymer as set forth in any of the above [1] to [12].

[15] An intermediate film for laminated glass containing the hydrogenated block copolymer as set forth in any of the above [1] to [12].

[16] The intermediate film for laminated glass as set forth in the above [1] containing the hydrogenated block copolymer as set forth in any of the above [1] to [12], provided that a peak top temperature of tan δ as measured with respect to a sheet-shaped test piece having a thickness of 1.0 mm, which is obtained by molding the copolymer according to the following molding condition, under a condition at a strain amount of 0.1%, a frequency of 1 Hz, a measurement temperature of −70 to 200° C., and a temperature rise rate of 3° C./min in conformity of JIS K7244-10 (2005) is −40 to 35° C.:

Molding condition: to apply a pressure at a temperature of 230° C. under a pressure of 10 MPa for 3 minutes.

[17] Adam rubber containing the hydrogenated block copolymer as set forth in any of the above [1] to [12].

[18] A shoe sole material containing the hydrogenated block copolymer as set forth in any of the above [1] to [12].

[19] A flooring material containing the hydrogenated block copolymer as set forth in any of the above [1] to [12].

[20] A laminate including an X layer containing the hydrogenated block copolymer as set forth in any of the above [1] to [12] and a Y layer laminated on at least one surface of the X layer.

[21] The laminate as set forth in the above [20], which is a laminate including the X layer and a plurality of the Y layers, in which the X layer being laminated between at least two Y layers, and which is satisfied with the following formula (I).

$$200 \leq (\text{peak top frequency of tan } \delta) \times \sqrt{B/m} \leq 2{,}000{,}000 \quad (I)$$

In the formula (I), B represents a bending stiffness (Pa·m³) per unit width of the laminate; m represents a surface density (kg/m²) of the laminate; and the peak top frequency (Hz) of tan δ represents a frequency when a peak of tan δ of the hydrogenated block copolymer determined according to the following method becomes maximum.

Measurement method of peak top frequency of tan δ: by using a sheet-shaped test piece having a thickness of 1.0 mm, which is obtained by molding the copolymer according to the following molding condition, a master curve calculated by the WLF method is prepared on the basis of measured values as measured under a condition at a strain amount of 0.1%, a frequency of 1 to 100 Hz, and a measurement temperature of 20° C., 10° C., 0° C., −10° C., and −30° C., respectively in conformity of JIS K7244-10 (2005), to determine the peak top frequency.

Molding condition: to apply a pressure at a temperature of 230° C. under a pressure of 10 MPa for 3 minutes.

[22] The laminate as set forth in the above [20] or [21], wherein the Y layer, or at least one of the plural Y layers is a glass layer.

[23] The laminate as set forth in the above [22], wherein a thickness of the glass layer is from 0.5 to 5 mm.

[24] The laminate as set forth in any of the above [20] to [23], wherein at least one of the plural Y layers is a layer containing a thermoplastic resin (i) different from the hydrogenated block copolymer as set forth in any of the above [1] to [12].

[25] The laminate as set forth in the above [24], wherein the thermoplastic resin (i) is a polyvinyl acetal resin.

[26] The laminate as set forth in the above [24], wherein the thermoplastic resin (i) is an ionomer.

[27] The laminate as set forth in any of the above [24] to [26], which is a laminate of a glass layer, a layer containing the thermoplastic resin (i), the X layer, a layer containing the thermoplastic resin (i), and a glass layer in this order.

[28] A laminated glass including the laminate as set forth in any of the above [20] to [27].

[29] The laminated glass as set forth in the above [28], which is a window shield for automobile, a side glass for automobile, a sunroof for automobile, a rear glass for automobile, or a glass for head-up display.

Advantageous Effects of Invention

In accordance with the present invention, it is possible to provide a hydrogenated block copolymer capable of enhancing the sound insulation properties in laminated glasses of any thickness as well as a vibration damping material, a sound insulator, an intermediate film for laminated glass with low shrinking properties, a dam rubber, a shoe sole material, a flooring material, a laminate, and a laminated glass, each of which is obtained by using the foregoing hydrogenated block copolymer.

BRIEF DESCRIPTION OF DRAWINGS

FIG. 1 is a diagrammatic view of a microphase-separated structure of a sphere.

FIG. 2 is a diagrammatic view of a microphase-separated structure of a cylinder.

FIG. 3 is a diagrammatic view of a microphase-separated structure of a lamella.

FIG. 4(a) is a graph showing a relation between a frequency and a sound transmission loss of each of laminates 3 and 4 in Example 1; and FIG. 4(b) is a graph showing a relation between a frequency and tan δ of a hydrogenated block copolymer used in Example 1.

FIG. 5(a) is a graph showing a relation between a frequency and a sound transmission loss of each of laminates 3 and 4 in Example 2; and FIG. 5(b) is a graph showing a relation between a frequency and tan δ of a hydrogenated block copolymer used in Example 2.

FIG. 6(a) is a graph showing a relation between a frequency and a sound transmission loss of each of laminates 3 and 4 in Example 3; and FIG. 6(b) is a graph showing a relation between a frequency and tan δ of a hydrogenated block copolymer used in Example 3.

FIG. 7(a) is a graph showing a relation between a frequency and a sound transmission loss of each of laminates 3 and 4 in Example 4; and FIG. 7(b) is a graph showing a relation between a frequency and tan δ of a hydrogenated block copolymer used in Example 4.

FIG. 8(a) is a graph showing a relation between a frequency and a sound transmission loss of each of laminates 3 and 4 in Example 5; and FIG. 8(b) is a graph showing a relation between a frequency and tan δ of a hydrogenated block copolymer used in Example 5.

FIG. 9(a) is a graph showing a relation between a frequency and a sound transmission loss of each of laminates 3 and 4 in Example 6; and FIG. 9(b) is a graph showing a relation between a frequency and tan δ of a hydrogenated block copolymer used in Example 6.

FIG. 10(a) is a graph showing a relation between a frequency and a sound transmission loss of each of laminates 3 and 4 in Example 7; and FIG. 10(b) is a graph showing a relation between a frequency and tan δ of a hydrogenated block copolymer used in Example 7.

FIG. 11(a) is a graph showing a relation between a frequency and a sound transmission loss of each of laminates 3 and 4 in Example 8; and FIG. 11(b) is a graph showing a relation between a frequency and tan δ of a hydrogenated block copolymer used in Example 8.

FIG. 12(a) is a graph showing a relation between a frequency and a sound transmission loss of each of laminates 3 and 4 in Example 9; and FIG. 12(b) is a graph showing a relation between a frequency and tan δ of a hydrogenated block copolymer used in Example 9.

FIG. 13(a) is a graph showing a relation between a frequency and a sound transmission loss of each of laminates 3 and 4 in Example 10; and FIG. 13(b) is a graph showing a relation between a frequency and tan δ of a hydrogenated block copolymer used in Example 10.

FIG. 14(a) is a graph showing a relation between a frequency and a sound transmission loss of each of laminates 3 and 4 in Example 11; and FIG. 14(b) is a graph showing a relation between a frequency and tan δ of a hydrogenated block copolymer used in Example 11.

FIG. 15(a) is a graph showing a relation between a frequency and a sound transmission loss of each of laminates 3 and 4 in Example 12; and FIG. 15(b) is a graph showing a relation between a frequency and tan δ of a hydrogenated block copolymer used in Example 12.

FIG. 16(a) is a graph showing a relation between a frequency and a sound transmission loss of each of laminates 3 and 4 in Example 13; and FIG. 16(b) is a graph showing a relation between a frequency and tan δ of a hydrogenated block copolymer used in Example 13.

FIG. 17(a) is a graph showing a relation between a frequency and a sound transmission loss of each of laminates 3 and 4 in Example 14; and FIG. 17(b) is a graph showing a relation between a frequency and tan δ of a hydrogenated block copolymer used in Example 14.

FIG. 18(a) is a graph showing a relation between a frequency and a sound transmission loss of each of laminates 3 and 4 in Example 15; and FIG. 18(b) is a graph showing a relation between a frequency and tan δ of a hydrogenated block copolymer used in Example 15.

FIG. 19(a) is a graph showing a relation between a frequency and a sound transmission loss of each of laminates 3 and 4 in Example 16; and FIG. 19(b) is a graph showing a relation between a frequency and tan δ of a hydrogenated block copolymer used in Example 16.

FIG. 20(a) is a graph showing a relation between a frequency and a sound transmission loss of each of laminates 3 and 4 in Comparative Example 1; and FIG. 20(b) is a graph showing a relation between a frequency and tan δ of a hydrogenated block copolymer used in Comparative Example 1.

FIG. 21(a) is a graph showing a relation between a frequency and a sound transmission loss of each of laminates 3 and 4 in Comparative Example 2; and FIG. 21(b) is a graph showing a relation between a frequency and tan δ of a hydrogenated block copolymer used in Comparative Example 2.

FIG. 22(a) is a graph showing a relation between a frequency and a sound transmission loss of each of laminates 3 and 4 in Comparative Example 3; and FIG. 22(b) is a graph showing a relation between a frequency and tan δ of a hydrogenated block copolymer used in Comparative Example 3.

FIG. 23(a) is a graph showing a relation between a frequency and a sound transmission loss of each of laminates 3 and 4 in Comparative Example 5; and FIG. 23(b) is a graph showing a relation between a frequency and tan δ of a hydrogenated block copolymer used in Comparative Example 5.

DESCRIPTION OF EMBODIMENTS

[Hydrogenated Block Copolymer]

The present invention is concerned with a hydrogenated block copolymer that is a hydrogenation product of a block copolymer including a polymer block (A) containing more than 70 mol % of a structural unit derived from an aromatic vinyl compound and a polymer block (B) containing 30 mol % or more of a structural unit derived from at least one selected from the group consisting of a conjugated diene compound and isobutylene, the hydrogenated block copolymer being satisfied with the following requirements (1) and (2):

Requirement (1): the content of the polymer block (A) in the block copolymer is 1 to 30% by mass; and Requirement (2): when the polymer block (B) is regarded as having a structure with a hydrogenation rate of 100 mol %, an average value of a methylene chain length of a main chain of the structural unit derived from at least one selected from the group consisting of a conjugated diene compound and isobutylene is 1.0 to 6.0.

So long as the hydrogenated block copolymer of the present invention is concerned, in in laminated glasses of any thickness, and particularly, even in laminated glasses using a thin glass (for example, the thickness is 2.5 mm or less), the sound insulation properties can be efficiently enhanced. As for this matter, it may be conjectured that the relation between a frequency at which a sound transmission loss (STL) is lowered due to a coincidence effect and a peak frequency of tan δ of the hydrogenated block copolymer could be regulated, and furthermore, as the case may be, the degree of a lowering of the sound transmission loss per se could be reduced, and the lowest frequency at which the coincidence effect is generated (a so-called coincidence critical frequency) could be increased.

The hydrogenated block copolymer of the present invention is hereunder described in detail.

The hydrogenated block copolymer of the present invention is a hydrogenation product of a block copolymer including the aforementioned polymer block (A) and polymer block (B).

(Polymer Block (A))

The polymer block (A) contains more than 70 mol % of a structural unit derived from an aromatic vinyl compound (hereinafter sometimes abbreviated as "aromatic vinyl compound unit"), and from the viewpoint of mechanical characteristics, the content of the aromatic vinyl compound unit is preferably 80 mol % or more, more preferably 85 mol % or more, still more preferably 90 mol % or more, especially preferably 95 mol % or more, and substantially 100 mol %.

Examples of the aforementioned aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, α-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, 3-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromostyrene, m-bromostyrene, p-bromostyrene, a styrene derivative substituted with a silyl group, indene, and vinylnaphthalene. These aromatic vinyl compounds may be used alone or may be used in combination of two or more thereof. Above all, from the viewpoint of production costs and balance in physical properties, styrene, α-methylstyrene, p-methylstyrene, and a mixture thereof are preferred, with styrene being more preferred.

However, the polymer block (A) may contain a structural unit derived from an unsaturated monomer other than the aromatic vinyl compound (hereinafter sometimes abbreviated as "other unsaturated monomer unit") in a proportion of 30 mol % or less so long as the object and effects of the present invention are not impaired. As the other unsaturated monomer, for example, at least one selected from the group consisting of butadiene, isoprene, 2,3-dimethylbutadiene, 1,3-pentadiene, 1,3-hexadiene, isobutylene, methyl methacrylate, methyl vinyl ether, N-vinylcarbazole, β-pinene, 8,9-p-menthene, dipentene, methylene norbornene, and 2-methylenetetrahydrofuran is exemplified. The bonding mode in the case where the polymer block (A) contains the other unsaturated monomer unit is not particularly limited, and may be either random or tapered.

The content of the structural unit derived from the aforementioned other unsaturated monomer in the polymer block (A) is preferably 10 mol % or less, more preferably 5 mol % or less, and still more preferably 0 mol %.

The block copolymer may include at least one aforementioned polymer block (A). In the case where the block copolymer includes two or more polymer blocks (A), those polymer blocks (A) may be the same as or different from each other. In this specification, the wording "different polymer blocks" means that at least one of the monomer units constituting the polymer block, the weight average molecular weight, the stereoregularity, and in the case where the block contains plural monomer units, the ratio of the monomer units and the copolymerization mode (random, gradient, or block) differs between the blocks.

Though the weight average molecular weight (Mw) of the aforementioned polymer block (A) which the block copolymer has is not particularly limited, the weight average molecular weight of at least one polymer block (A) among the aforementioned polymer blocks (A) which the block copolymer has is preferably 3,000 to 60,000, and more preferably 4,000 to 50,000. When the block copolymer has at least one polymer block (A) having a weight average molecular weight falling within the aforementioned range, the mechanical strength is more improved, and the film moldability is excellent, too.

The "weight average molecular weight" described in this specification and the claims is everywhere a weight average molecular weight expressed in terms of standard polystyrene as determined through the gel permeation chromatography (GPC). The weight average molecular weight of each of the polymer blocks (A) which the block copolymer has can be determined by measuring the liquid sampled every time after the polymerization to give each polymer block in the production process. In addition, for example, in the case of a triblock copolymer having a structure of A1-B-A2, the weight average molecular weights of the first polymer block A1 and the polymer block B are measured by the aforementioned method, and by subtracting these from the weight average molecular weight of the block copolymer, the weight average molecular weight of the second polymer block A2 can be determined. In addition, as another method, in the case of the triblock copolymer having a structure of A1-B-A2, the weight average molecular weight of the total of the polymer block (A) can be calculated from the weight average molecular weight of the block copolymer and the total content of the polymer block (A) as confirmed through the $^1$H-NMR measurement, in which the weight average molecular weight of the deactivated first polymer block A1 is calculated through the GPC measurement, and by subtracting it, the weight average molecular weight of the second polymer block A2 can be obtained, too.

The hydrogenated block copolymer of the present invention is satisfied with the following requirement (1).
<Requirement (1)>

The content of the polymer block (A) in the aforementioned block copolymer (in the case where the block of the hydrogenated copolymer has plural polymer blocks (A), the total content thereof) is 1 to 30% by mass.

When the content of the polymer block (A) is less than 1% by mass, it becomes difficult to form pellets of the hydrogenated block copolymer. On the other hand, when the content of the polymer block (A) is more than 30% by mass, the flexibility becomes poor, the peak top intensity of tan δ is lowered, and the low shrinking properties and the moldability become poor. From the same viewpoint, the content of the aforementioned polymer block (A) is preferably 2 to 27% by mass, more preferably 2 to 18% by mass, still more preferably 3 to 18% by mass, especially preferably 3.5 to 18% by mass, and most preferably 3.5 to 15% by mass. In addition, taking into consideration the matter that it is easy to form a microphase-separated structure of a sphere as mentioned later, the content of the polymer block (A) is preferably 3 to 15% by mass, more preferably 3.5 to 11% by mass, and still more preferably 3.5 to 4.5% by mass. Taking into consideration the handling properties and the mechanical physical properties of the film, the content of the polymer block (A) is preferably 6 to 18% by mass, more preferably 6 to 15% by mass, still more preferably 8 to 15% by mass, and especially preferably 10 to 15% by mass.

The content of the polymer block (A) in the block copolymer is a value determined through the $^1$H-NMR measurement, and in more detail, it is a value measured according to the method described in the section of Examples.
(Polymer Block (B))

The polymer block (B) contains a structural unit derived from at least one selected from the group consisting of a conjugated diene compound and isobutylene in an amount of 30 mol % or more, preferably 50 mol % or more, more preferably 65 mol % or more, and still more preferably 80 mol % or more.

The polymer block (B) may contain 30 mol % or more of a structural unit derived from a conjugated diene compound, may contain 30 mol % or more of a structural unit derived from isobutylene, or may contain 30 mol % or more of a structural unit derived from a mixture of a conjugated diene compound and isobutylene. In addition, the polymer block (B) may contain 30 mol % or more of a structural unit derived from one conjugated diene compound or may contain 30 mol % or more of a structural unit derived from two or more conjugated diene compounds.

Examples of the aforementioned conjugated diene compound include isoprene, butadiene, hexadiene, 2,3-dimethyl-1,3-butadiene, 1,3-pentadiene, and myrcene. Above all, isoprene, butadiene, and a mixture of isoprene and butadiene are preferred, with isoprene being more preferred. In the case of a mixture of butadiene and isoprene, though a mixing ratio thereof [isoprene/butadiene] (mass ratio) is not particularly limited, it is preferably 5/95 to 95/5, more preferably 10/90 to 90/10, still more preferably 40/60 to 70/30, and especially preferably 45/55 to 65/35. When the foregoing mixing ratio [isoprene/butadiene] is expressed in terms of a molar ratio, it is preferably 5/95 to 95/5, more preferably 10/90 to 90/10, still more preferably 40/60 to 70/30, and especially preferably 45/55 to 55/45.

As mentioned above, it is preferred that the polymer block (B) contains 30 mol % or more of a structural unit derived from a conjugated diene compound; it is also preferred that the polymer block (B) contains 30 mol % or more of a structural unit derived from isoprene (hereinafter sometimes abbreviated as "isoprene unit"); it is also preferred that the polymer block (B) contains 30 mol % or more of a structural unit derived from butadiene (hereinafter sometime abbreviated as "butadiene unit"); and it is also preferred that the polymer block (B) contains 30 mol % or more of a structural unit derived from a mixture of isoprene and butadiene (hereinafter sometimes abbreviated as "mixture unit of isoprene and butadiene").

In the case where the polymer block (B) has two or more structural units, the bonding mode thereof can be random, tapered, completely alternate, partially block, or block, or may be in the form of a combination of two or more thereof.
<Requirement (2)>
(Average Value of Methylene Chain Length of Polymer Block (B)>

In the present invention, when the polymer block (B) is regarded as having a structure with a hydrogenation rate of 100 mol %, an average value of a methylene chain length (hereinafter sometimes referred to as "average methylene chain length") of a main chain of the structural unit derived from at least one selected from the group consisting of a conjugated diene compound and isobutylene is 1.0 to 6.0.

Here, the methylene chain length expresses to what extent the methylene group represented by —CH$_2$— continuously bonds.

When the average methylene chain length is more than 6.0, crystallization is liable to occur, the damping properties are lowered, and when used for a laminated glass, the sound insulation properties are lowered. From the same viewpoint, the average methylene chain length is preferably 1.0 to 5.0, more preferably 1.0 to 4.0, still more preferably 1.0 to 3.5, yet still more preferably 1.5 to 3.5, especially preferably 1.5 to 3.0, and most preferably 1.5 to 2.2.

The average methylene chain length is hereunder described while expressing the structures.

[Chem. 1]

(i) Case where isoprene is connected through 1,4-bond:

Average methylene chain length=3

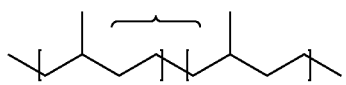

(ii) Case where 1,2-bond and 1,4-bond of butadiene are equally connected:

Average methylene chain length=5

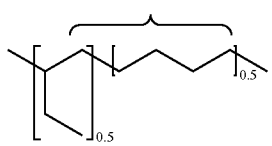

(iii) Case where 1,2-bond and 1-4-bond of butadiene are connected in a molar ratio of 4/6:

Average methylene chain length=7

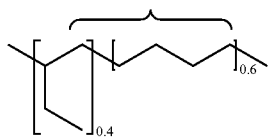

Calculation is made taking into account how much butadiene with 1,4-bond is connected relative to one butadiene with 1,2-bond, as mentioned below.

$$1 + 4 \times \frac{0.6}{0.4} = 7$$

(iv) Case of isobutylene:

Average methylene chain length=1

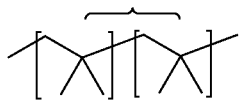

<Requirement (3)>
(Average Value of Substituent Constant (v) of Side Chain which Main Chain has Per Ethylene Unit in Polymer Block (B)>

In the present invention, it is preferred that when the polymer block (B) is regarded as having a structure with a hydrogenation rate of 100 mol %, an average value of a substituent constant (v) (hereinafter sometimes referred to "average substituent constant") of a side chain which the main chain has per ethylene unit is 0.25 to 1.1. Here, the average substituent constant of a side chain which the main chain has per ethylene unit expresses an average value of bulkiness of the substituent serving as a side chain, and with respect to the substituent constant (v), "Journal of the American Chemical Society" (1975), Vol. 97, pp. 1552-1556 can be made by reference. When the average substituent constant is 0.25 or more, not only the damping properties become high, but also when used for a laminate (for example, a laminated glass), the sound insulation properties become high, and when it is 1.1 or less, the generation of rigidity of the main chain can be suppressed, the damping properties become high, and when used for a laminate (for example, a laminated glass), the sound insulation properties become high. From the same viewpoint, the average substituent constant is more preferably 0.30 to 0.55, still more preferably 0.33 to 0.55, and especially preferably 0.33 to 0.50.

With respect to the substituent constant (v), though specific examples thereof are shown in the following Table 1, besides, values described in "Journal of the American Chemical Society" (1975), Vol. 97, pp. 1552-1556 and "Journal of Organic Chemistry" (1976), Vol. 41, pp. 2217-2220 can be utilized.

TABLE 1

| Substituent of side chain | Substituent constant (v) |
|---|---|
| H | 0 |
| Methyl group | 0.52 |
| t-Butyl group | 1.24 |
| Ethyl group | 0.56 |
| n-Propyl group | 0.68 |
| Isopropyl group | 0.76 |
| n-Butyl group | 0.68 |
| s-Butyl group | 1.02 |
| Phenyl group | 0.57 |

The average substituent constant is determined by calculating an average value of the substituent constant (v) of each side chain. For example, in the case where the aforementioned conjugated diene compound is isoprene, and the content ratio of the 1,4-bond unit and the 3,4-bond unit is 40/60 (molar ratio), the average substituent constant is 0.47 and can be determined as follows.

[Chem. 2]

In addition, in the case where the aforementioned conjugated diene compound is butadiene, and the content ratio of the 1,4-bond unit and the 1,2-bond unit is 23/77 (molar ratio), the average substituent constant is 0.35 and can be determined as follows.

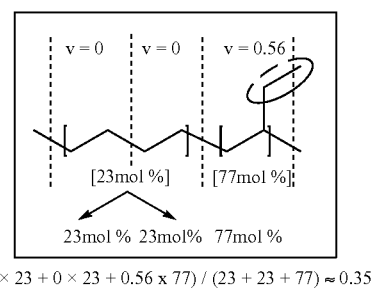

In addition, in the case where the aforementioned conjugated diene compound is a mixture of isoprene and butadiene (molar ratio: 50/50), the content ratio of the 1,4-bond unit and the 3,4-bond unit in isoprene is 40/60 (molar ratio), and the content ratio of the 1,4-bond unit and the 1,2-bond unit in butadiene is 40/60 (molar ratio), the average substituent constant is 0.36 and can be determined as follows.

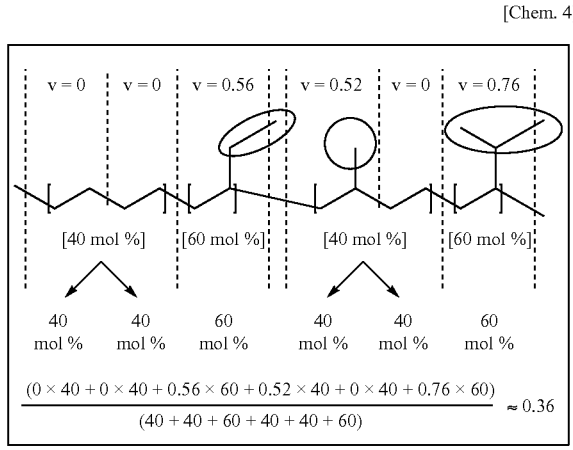

In addition, in the case where though the aforementioned conjugated diene compound is mainly isoprene, it contains 12 mol % of styrene, and the content ratio of the 1,4-bond unit and the 3,4-bond unit in isoprene is 40/60 (molar ratio), the average substituent constant is 0.48 and can be determined as follows.

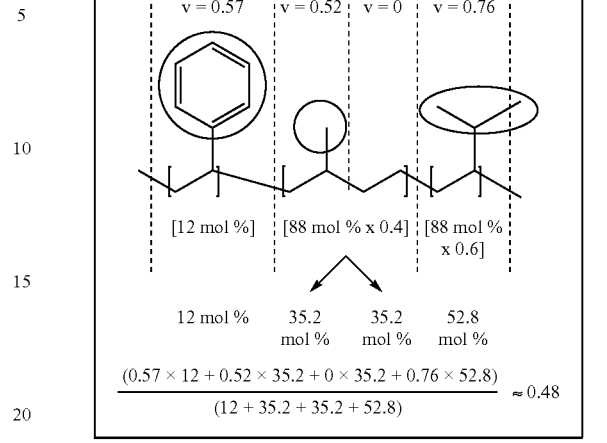

<Requirement (4)>
(Vinyl Bond Amount of Polymer Block (B))

In the case where the constitutional unit constituting the polymer block (B) is any one of an isoprene unit, a butadiene unit, and a mixture unit of isoprene and butadiene, as the bonding mode of each of isoprene and butadiene, in the case of butadiene, the 1,2-bond and the 1,4-bond can be taken, and in the case of isoprene, the 1,2-bond, the 3,4-bond, and the 1,4-bond can be taken.

In the block copolymer, the total of the contents of the 3,4-bond unit and the 1,2-bond unit (hereinafter sometimes referred to as "vinyl bond amount") in the polymer block (B) is preferably 20 mol % or more, more preferably 40 mol % or more, and still more preferably 50 mol % or more. In addition, though there is no particular limitation, the vinyl bond amount in the polymer block (B) is preferably 90 mol % or less, and more preferably 85 mol % or less. Here, the vinyl bond amount is a value calculated through the $^1$H-NMR measurement according to the method described in the section of Examples.

In the case where the polymer block (B) is composed only of butadiene, the aforementioned wording "contents of the 3,4-bond unit and the 1,2-bond unit" is replaced with the wording "content of the 1,2-bond unit" and applied.

From the viewpoint of damping properties as well as sound insulation properties when formed into a laminate (for example, a laminated glass) and so on, the weight average molecular weight of the total of the aforementioned polymer block (B) which the block copolymer has is preferably 15,000 to 800,000, more preferably 50,000 to 700,000, still more preferably 70,000 to 600,000, especially preferably 90,000 to 500,000, and most preferably 130,000 to 450,000 in the state before the hydrogenation.

The polymer block (B) may contain a structural unit derived from a polymerizable monomer other than the conjugated diene compound and isobutylene so long as the object and effects of the present invention are not impaired. In this case, in the polymer block (B), the content of the structural unit derived from a polymerizable monomer other than the conjugated diene compound and isobutylene is preferably less than 70 mol %, more preferably less than 50 mol %, still more preferably less than 35 mol %, and especially preferably less than 20 mol %. Though a lower limit value of the content of the structural unit derived from a polymerizable monomer other than the conjugated diene compound and isobutylene is not particularly limited, it may be 0 mol %, may be 5 mol %, and may be 10 mol %.

Preferred examples of the other polymerizable monomer include at least one compound selected from the group consisting of aromatic vinyl compounds, such as styrene, α-methylstyrene, o-methylstyrene, m-methylstyrene, p-methylstyrene, p-t-butylstyrene, 2,4-dimethylstyrene, vinylnaphthalene, and vinylanthracene; as well as methyl methacrylate, methyl vinyl ether, N-vinylcarbazole, β-pinene, 8,9-p-menthene, dipentene, methylene norbornene, 2-methylenetetrahydrofuran, 1,3-cyclopentadiene, 1,3-cyclohexadiene, 1,3-cycloheptadiene, and 1,3-cyclooctadiene. Above all, styrene, α-methylstyrene, and p-methylstyrene are preferred, with styrene being more preferred.

In the case where the polymer block (B) contains a structural unit derived from a polymerizable monomer other than the conjugated diene compound and isobutylene, a specific combination thereof is preferably isoprene and styrene, or butadiene and styrene, and more preferably isoprene and styrene.

In the case where the polymer block (B) contains a structural unit derived from a polymerizable monomer other than the conjugated diene compound and isobutylene, the bonding mode thereof is not particularly limited, and though it may be any of random and tapered ones, it is preferably random one.

The block copolymer may contain at least one aforementioned polymer block (B). In the case where the block copolymer has two or more polymer blocks (B), those polymer blocks (B) may be the same as or different from each other.

(Bonding Mode of Polymer Block (A) and Polymer Block (B))

In the block copolymer, so long as the polymer block (A) and the polymer block (B) bond to each other, the bonding mode thereof is not particularly limited, and it may be any one of a linear bonding mode, a branched bonding mode, and a radial bonding mode, or a combination of two or more thereof. Above all, the bonding mode of the polymer block (A) and the polymer block (B) is preferably a linear bonding mode, and examples thereof include, when the polymer block (A) is represented by A, and the polymer block (B) is by B, a diblock copolymer represented by A-B, a triblock copolymer represented by A-B-A or B-A-B, a tetrablock copolymer represented by A-B-A-B, a pentablock copolymer represented by A-B-A-B-A or B-A-B-A-B, and an (A-B)nX type copolymer (wherein X represents a coupling agent residue, and n represents an integer of 3 or more). Above all, a linear triblock copolymer or diblock copolymer is preferred, and an A-B-A type triblock copolymer is preferably used from the viewpoint of flexibility, easiness of production, and so on.

Here, in this specification, in the case where polymer blocks of the same kind bond linearly via a bifunctional coupling agent or the like, all the bonding polymer blocks are dealt with as one polymer block. According to this, including the above-mentioned exemplifications, the polymer block to be strictly expressed as Y—X—Y (wherein X represents a coupling residue) is expressed as Y as a whole except for the case where it must be specifically differentiated from a single polymer block Y. In this description, the polymer block of this kind that contains a coupling agent residue is dealt with as above, and therefore, for example, a block copolymer that contains a coupling agent residue and is to be strictly expressed as A-B-X-B-A (wherein X represents a coupling agent residue) is expressed as A-B-A and is dealt with as an example of a triblock copolymer.

The present invention is concerned with a hydrogenation product of the aforementioned block copolymer (also referred to as "hydrogenated block copolymer").

From the viewpoint of heat resistance, weather resistance, and damping properties as well as sound insulation when formed into a laminate (for example, a laminated glass), the carbon-carbon double bond which the polymer block (B) has is hydrogenated in a rate of preferably 80 mol % or more, more preferably 85 mol % or more, still more preferably 89 mol % or more, yet still more preferably 90 mol % or more, and especially preferably 93 mol % or more. The foregoing value is sometimes referred to as "hydrogenation rate". Though an upper limit value of the hydrogenation rate is not particularly limited, the upper limit value may be 99 mol % and may be 98 mol %.

The aforementioned hydrogenation rate is a value obtained by determining the content of the carbon-carbon double bond in the structural unit derived from the conjugated diene compound in the polymer block (B) through the $^1$H-NMR measurement after the hydrogenation, and in more detail, it is a value according to the method described in the section of Examples.

(Weight Average Molecular Weight (Mw) of Hydrogenated Block Copolymer)

The weight average molecular weight (Mw) of the hydrogenated block copolymer as expressed in terms of standard polystyrene by means of the gel permeation chromatography is preferably 15,000 to 800,000, more preferably 50,000 to 700,000, still more preferably 70,000 to 600,000, especially preferably 90,000 to 500,000, and most preferably 130,000 to 450,000. When the weight average molecular weight of the block copolymer is 15,000 or more, the heat resistance becomes high, and when it is 800,000 or less, the moldability becomes favorable.

So long as the object and effects of the present invention are not impaired, the hydrogenated block copolymer of the present invention may have one or more functional groups, such as a carboxy group, a hydroxy group, an acid anhydride group, an amino group, and an epoxy group, in a molecular chain and/or a molecular end, and it may also be one not having a functional group.

(Peak Top Intensity of Tan δ and Peak Top Temperature of Tan δ)

With respect to a test piece prepared by pressurizing the hydrogenated block copolymer of the present invention at a temperature of 230° C. and a pressure of 10 MPa for 3 minutes to prepare a single-layer sheet having a thickness of 1.0 mm and cutting out the single-layer sheet in a disk shape, its peak top intensity of tan δ as measured under a condition at a strain amount of 0.1%, a frequency of 1 Hz, a measurement temperature of −70 to 200° C., and a temperature rise rate of 3° C./min in conformity of JIS K7244-10 (2005) may be 0.5 or more. As for one having a higher peak top intensity of tan δ, the value may be 1.0 or more, further 1.5 or more, and still further 2.0 or more. In view of the fact that the peak top intensity of tan δ is high, the hydrogenated block copolymer of the present invention is excellent in the damping properties and the sound insulation properties.

The peak top intensity of tan δ indicates a value of tan δ when the peak of tan δ is maximum. In more detail, the measurement method of the peak top intensity of tan δ is one described in the section of Examples.

In the case where the hydrogenated block copolymer of the present invention is used for an intermediate film for laminated glass as mentioned later, the peak top temperature of tan δ as measured under the aforementioned conditions (temperature at which the peak of tan δ becomes maximum) is preferably −40 to 35° C., more preferably −25 to 15° C., and still more preferably −15 to 5° C. In addition, in the case where the hydrogenated block copolymer of the present invention is used for an application of sound insulator or vibration damping material as mentioned later, in particular, an application of sound insulator or vibration damping material of an automobile, the aforementioned peak top temperature of tan δ is preferably −10 to 50° C., more preferably 0 to 40° C., and still more preferably 10 to 35° C.

As a value of a storage modulus (G') of the hydrogenated block copolymer at ((peak top temperature of tan δ)+30° C.) is lower, the energy absorption on glass transition becomes larger, and therefore, the damping properties become high, and the sound insulation properties become high when used for a laminate (for example, a laminated glass). The storage modulus (G') at ((peak top temperature of tan)+30° C.) is preferably 0.01 to 3 MPa, more preferably 0.03 to 1 MPa, still more preferably 0.05 to 0.7 MPa, and especially preferably 0.1 to 0.5 MPa.

When a minimum value of a value obtained by differentiating the storage modulus (G') of the hydrogenated block copolymer with the temperature is defined as "d(G')/dTemp.", as this value is smaller, the peak top intensity of tan δ of the hydrogenated block copolymer becomes higher, and the hydrogenated block copolymer is more excellent in the damping properties and the sound insulation properties. The d(G')/dTemp. is preferably −20 MPa/° C. or less, more preferably −30 MPa/° C. or less, still more preferably −40 MPa/° C. or less, and especially preferably −43 MPa/° C. or less.

(Morphology)

The morphology of a film having a thickness of 1 mm, which is obtained by molding the hydrogenated block copolymer of the present invention under a pressurizing condition at a temperature of 230° C. and a pressure of 10 MPa for 3 minutes, has a microphase-separated structure of a sphere as illustrated in FIG. 1 or a cylinder as illustrated in FIG. 2. In the case where the morphology of the film has a microphase-separated structure of a sphere, the polymer block (A) becomes spherical and exists in the polymer block (B), whereas in the case where the morphology of the film has a microphase-separated structure of a cylinder, the polymer block (A) becomes cylindrical and exists in the polymer block (B). As mentioned above, as the content of the aforementioned polymer block (A) is smaller, the morphology of the film more likely has a microphase-separated structure of a sphere.

In view of the fact that the morphology of the film obtained through molding as mentioned above has a microphase-separated structure of a sphere or cylinder, the damping properties and the sound insulating properties when formed into a laminate (for example, a laminated glass) become much more higher. From the same viewpoint, it is more preferred that the morphology of the film has a microphase-separated structure of a sphere.

As illustrated in FIG. 3, in the case where the film has a microphase-separated structure of a lamella structure where a layer of the polymer block (A) and a layer of the polymer block (B) are alternately superimposed, the film is poor in the moldability, the damping properties, and the sound insulation properties when formed into a laminate (for example, a laminated glass).

(Shrinkage Factor in MD Direction)

In the hydrogenated block copolymer of the present invention, with respect to the shrinkage factor in the MD direction (machine direction) as defined below, it is possible to achieve 20% or less, and it is also possible to achieve 15% or less. It may be said that the matter that the shrinkage factor is 15% or less is excellent in the low shrinking properties.

Shrinkage factor in the MD direction: after stationarily placing a ribbon sheet (MD/TD=4.0 cm/3.5 cm, thickness=1 mm) obtained by extrusion molding under an unstretched condition at 230° C. on talc at 230° C. for one week, when the length in the MD direction is taken as y, and an initial length (4.0 cm) in the MD direction is taken as x, the shrinkage factor in the MD direction is defined as $\{(x-y)/x\}\times 100(\%)$.

The shrinkage factor can be 10% or less, and it may be further 6% or less and 3% or less. TD means the transverse direction.

(Production Method of Hydrogenated Block Copolymer)

The hydrogenated block copolymer of the present invention can be produced according to a solution polymerization method, an emulsion polymerization method, a solid-phase polymerization method, or the like. Above all, a solution polymerization method is preferred, and for example, a known method, such as an ionic polymerization method, e.g., anionic polymerization and cationic polymerization, or a radical polymerization method, is applicable. Above all, an anionic polymerization method is preferred. In the anionic polymerization method, an aromatic vinyl compound and at least one selected from the group consisting of a conjugated diene compound and isobutylene are successively added in the presence of a solvent, an anionic polymerization initiator, and optionally, a Lewis base, to obtain a block copolymer, and optionally, a coupling agent is added to allow the mixture to react with other, followed by subjecting the block copolymer to hydrogenation, whereby the hydrogenated block copolymer can be obtained.

In the aforementioned method, examples of an organic lithium compound which may be used as the polymerization initiator for anionic polymerization include methyllithium, ethyllithium, n-butyllithium, sec-butyllithium, tert-butyllithium, and pentyllithium. Examples of a dilithium compound which may also be used as the polymerization initiator include naphthalenedilithium and dilithiohexylbenzene.

Examples of the aforementioned coupling agent include dichloromethane, dibromomethane, dichloroethane, dibromoethane, dibromobenzene, and phenyl benzoate.

The amount of each of the polymerization initiator and the coupling agent to be used is suitably determined depending on the desired weight average molecular weight of the intended hydrogenated block copolymer. In general, the initiator, such as an alkyllithium compound and a dilithium compound, is used preferably in a proportion of 0.01 to 0.2 parts by mass based on 100 parts by mass of the total amount of the monomers to be used for the polymerization, inclusive of an aromatic vinyl compound, butadiene, and isoprene. In the case where the coupling agent is used, the amount thereof to be used is preferably 0.001 to 0.8 parts by mass based on 100 parts by mass of the total amount of the monomers.

The solvent is not particularly limited so long as it does not adversely affect the anionic polymerization reaction. Examples thereof include aliphatic hydrocarbons, such as cyclohexane, methylcyclohexane, n-hexane, and n-pentane; and aromatic hydrocarbons, such as benzene, toluene, and xylene. The polymerization reaction is typically performed at a temperature of 0 to 100° C., and preferably 10 to 70° C. for 0.5 to 50 hours, and preferably 1 to 30 hours.

In the case where the polymer block (B) of the block copolymer is a structural unit derived from a conjugated diene, the content of each of the 3,4-bond and the 1,2-bond of the polymer block (B) can be increased by a method of adding a Lewis base as a co-catalyst on the polymerization.

Examples of the Lewis base which can be used include ethers, such as dimethyl ether, diethyl ether, and tetrahydrofuran; glycol ethers, such as ethylene glycol dimethyl ether and diethylene glycol dimethyl ether; and amines, such as triethylamine, N,N,N',N'-tetramethylenediamine, and N-methylmorpholine.

These Lewis bases can be used either alone or in combination of two or more thereof.

In the case where the aforementioned polymer block (B) contains a structural unit derived from a conjugated diene compound, in particular, isoprene and/or butadiene, the addition amount of the Lewis base is determined depending upon the intended vinyl bonding amount of the isoprene unit and/or the butadiene unit constituting the polymer block (B). For that reason, though the addition amount of the Lewis base is not strictly limited, it is preferred to use the Lewis base in an amount in the range of typically from 0.1 to 1,000 mol, and preferably from 1 to 100 mol per gram atom of lithium contained in the alkyllithium compound or the dilithium compound to be used as the polymerization initiator.

After performing the polymerization according to the aforementioned method, an active hydrogen compound, such as an alcohol, a carboxylic acid, and water, is added to stop the polymerization reaction. Thereafter, a hydrogenation reaction is performed in an inert organic solvent in the presence of a hydrogenation catalyst. The hydrogenation reaction can be carried out under a hydrogen pressure of 0.1 to 20 MPa, preferably 0.5 to 15 MPa, and more preferably 0.5 to 5 MPa at a reaction temperature of 20 to 250° C., preferably 50 to 180° C., and more preferably 70 to 180° C. for a reaction time of typically 0.1 to 100 hours, and preferably 1 to 50 hours.

Examples of the hydrogenation catalyst include Raney nickel; a heterogeneous catalyst having a metal, such as Pt, Pd, Ru, Rh, and Ni, supported on an elemental substance, such as carbon, alumina, and diatomaceous earth; a Ziegler-based catalyst composed of a combination of a transition metal compound with an alkylaluminum compound, an alkyllithium compound, or the like; and a metallocene-based catalyst.

The hydrogenated block copolymer thus obtained can be acquired by solidification by pouring the polymerization reaction liquid into methanol or the like, followed by heating or drying under reduced pressure; or subjecting to so-called steam stripping by pouring the polymerization reaction liquid into hot water along with steam and subjecting the solvent to azeotropic removal, followed by heating or drying under reduced pressure.

[Use]

The hydrogenated block copolymer of the present invention is excellent in the damping properties and the sound insulating properties when formed into a laminate (for example, a laminated glass). For that reason, the present invention also provides an intermediate film for laminated glass containing the hydrogenated block copolymer of the present invention. In addition, the present invention provides a dam rubber, a shoe sole material, a flooring material, and so on, each containing the hydrogenated block copolymer of the present invention. Furthermore, the hydrogenated block copolymer of the present invention is useful as a sound insulator and a vibration damping material. The hydrogenated block copolymer of the present invention may also be used for a weather strip, a floor mat, and so on.

In particular, when the hydrogenated block copolymer of the present invention is used as an intermediate film for laminated glass, the intermediate film is excellent in the low shrinking properties, and therefore, it is possible to provide an adhesive layer between the intermediate film and a glass.

In addition, the hydrogenated block copolymer of the present invention can be utilized for a sealing material, an adhesive, a pressure-sensitive adhesive, a packing material, an O-ring, a belt, a soundproof material, and so on in various recorders in the field of household electrical appliance, such as a Blu-ray recorder and an HDD recorder; and in various electrical products, such as a projector, a game player, a digital camera, a home video recorder, an antenna, a speaker, an electronic dictionary, an IC recorder, a fax machine, a copying machine, a telephone, an intercom, a rice cooker, a microwave oven, a multifunction microwave oven, a refrigerator, a dishwasher, a dish dryer, an IH cooking heater, a hot plate, a vacuum cleaner, a washing machine, a battery charger, a sewing machine, an iron, a drier, a power-assisted bicycle, an air cleaner, a water purifier, an electric toothbrush, lighting equipment, an air conditioner, an outdoor unit of air conditioner, a dehumidifier, and a humidifier.

[Laminate]

The present invention also provides a laminate including an X layer containing the hydrogenated block copolymer of the present invention and a Y layer laminated on at least one surface of the X layer. The laminate of the present invention is excellent in the damping properties and the sound insulation properties.

The laminate may be a laminate configured of one X layer and one Y layer; may be a laminate configured of one X layer and two or more Y layers; may be a laminate configured of two or more X layers and one Y layer; or may be a laminate configured of two or more X layers and two or more Y layers.

As for the configuration of the laminate of the present invention, when the X layer is expressed as "X", and the Y layer is expressed as "Y", though the configuration is not particularly limited, examples thereof include Y/X/Y, Y/X, and Y/X/Y/X/Y.

The plural Y layers may be made of the same material or may be made of a different material from each other. In the case where the plural Y layers are made of a different material from each other, when the Y layers made of a different material from each other are expressed in the order of "Y1", "Y2", "Y3", . . . , though the configuration of the laminate of the present invention is not particularly limited, examples thereof include Y1/X/Y1, Y2/Y1/X/Y1/Y2, Y1/X/Y2, X/Y1/Y2, Y1/X/Y2/Y3, and Y1/X/Y2/X/Y3. Above all, a laminate having a configuration of Y1/X/Y1, Y2/Y1/X/Y1/Y2, or Y1/X/Y2 is preferred, and a laminate having a configuration of Y1/X/Y1 or Y2/Y1/X/Y1/Y2 is more preferred.

Above all, a laminate including the X layer and a plurality of the Y layers, in which the X layer is laminated between at least two Y layers and which is satisfied with the following formula (I), is preferred. The value of the center of the formula (I), namely "(peak top frequency of tan δ)× $(B/m)^{0.5}$" is hereinafter sometimes referred to as "I value".

As a result of various investigations made by the present inventors, it has been found that B, m, and the peak top frequency of tan δ correlate with the sound insulation properties, and the formula (I) expresses a relation thereof. The laminate which is satisfied with the formula (I) is preferred from the standpoint that a lowering of the sound insulation properties due to a lowering of STL to be caused due to the coincidence effect can be effectively suppressed because the peak top frequency of tan δ of the hydrogenated copolymer becomes a value close to the coincidence critical frequency of the laminate.

$$200 \le (\text{peak top frequency of tan}\delta) \times \sqrt{B/m} \le 2{,}000{,}000 \quad (I)$$

In the formula (I), B represents a bending stiffness (Pa·m³) per unit width of the laminate; m represents a surface density (kg/m²) of the laminate; and the peak top frequency (Hz) of tan δ represents a frequency when a peak of tan δ of the hydrogenated block copolymer determined according to the following method becomes maximum.
(Measurement Method of Peak Top Frequency of Tan δ)

With respect to a test piece having a thickness of 1.0 mm as prepared by pressurizing the hydrogenated block polymer at a temperature of 230° C. under a pressure of 10 MPa for 3 minutes, a master curve calculated by the WLF method (Williams-Landel-Ferry method) is prepared on the basis of measured values as measured under a condition at a strain amount of 0.1%, a frequency of 1 to 100 Hz, and a measurement temperature of 20° C., 10° C., 0° C., –10° C., and –30° C., respectively in conformity of JIS K7244-10 (2005), and the peak top frequency of the hydrogenated block copolymer is calculated.

As for the measurement method of the bending stiffness per unit width as represented by B and the determination of the surface density as represented by m in the aforementioned formula (I), the following methods can be adopted.
(Measurement Method of Bending Stiffness (B) Per Unit Width)

A central portion of the laminate is fixed to a tip portion of an exciting force detector built in an impedance head of an exciter (power amplifier/model 371-A) of a mechanical impedance instrument (manufactured by Ono Sokki Co., Ltd., mass cancel amplifier: MA-5500, channel data station: DS-2100). A vibration is given to the central portion of the laminate at a frequency in the range of from 0 to 8,000 Hz. An exciting force and an acceleration waveform at this point are detected, thereby performing a damping test of the laminate by the central exciting method. A mechanical impedance at an exciting point (the central portion of the laminate to which a vibration has been given) is determined on the basis of the obtained exciting force and a speed signal obtained by integrating an acceleration signal; and in an impedance curve obtained by setting the frequency on the abscissa and the mechanical impedance on the ordinate, respectively, the bending stiffness (Pa·m³) per unit width of the laminate is calculated from the frequency expressing the peak (see ISO 16940:2008).

$$B_{eq,i} = m_s \left( f_{res,i} \frac{2\pi L^2}{\lambda_i^2} \right)^2$$

In the aforementioned formula, $B_{eq}$ is a bending stiffness per unit width; $m_s$ is a surface density; $f_{res}$ is a peak frequency of the impedance test; L is a measured length of the laminated glass; and λ is a constant (=7.85476).
(Determination of Surface Density (m))

A mass per unit area of the laminate, namely a surface density can be determined by measuring a mass of the laminate and dividing it by a surface area. The surface area of the laminate can be determined from (length)×(breadth) upon making the laminate rectangular or square.

When the aforementioned formula (I) is satisfied, the sound insulation properties become very high. From the same viewpoint, a lower limit value of the I value is preferably 400, more preferably 1,000, still more preferably 2,000, and especially preferably 4,000. In addition, from the same viewpoint, an upper limit value of the I value is preferably 1,000,000, more preferably 400,000, still more preferably 200,000, and especially preferably 100,000. These lower limit value and upper limit value can be adopted for the formula (I) independently or in an arbitrary combination.
[X Layer]

The X layer is a layer containing the hydrogenated block copolymer of the present invention, and it may be a layer composed only of the hydrogenated block copolymer of the present invention or may be a layer composed of a composition containing a component other than the hydrogenated block copolymer of the present invention.

For example, even in the case where the X layer is used as an intermediate film for laminated glass, the X layer is a layer containing the hydrogenated block copolymer of the present invention, and it may be a layer composed only of the hydrogenated block copolymer of the present invention or may be a layer composed of a composition containing a component other than the hydrogenated block copolymer of the present invention. In the case where the X layer is used as an intermediate film for laminated glass, examples of the component other than the hydrogenated block copolymer of the present invention include an antioxidant, a UV absorbent, a light stabilizer, a heat insulating material, and an antiblocking agent, but the component is not particularly limited thereto. These materials can be used either alone or in combination of two or more thereof.

Examples of the antioxidant include a phenol-based antioxidant, a phosphorus-based antioxidant, and a sulfur-based antioxidant.

As the UV absorber, in addition to a benzotriazole-based UV absorber, a hindered amine-based UV absorber, and a benzoate-based UV absorber, a triazine-based compound, a benzophenone-based compound, a malonic acid ester compound, an oxalic acid anilide compound, and the like can be used.

Examples of the light stabilizer include a hindered amine-based light stabilizer.

Examples of the heat insulating material include materials containing a heat ray shielding particle having a heat ray shielding function, or an organic dye compound having a heat ray shielding function, in a resin or a glass. Examples of the particle having a heat ray shielding function include a particle of an oxide, such as tin-doped indium oxide, antimony-doped tin oxide, aluminum-doped zinc oxide, tin-doped zinc oxide, and silicon-doped zinc oxide; and a particle of an inorganic material having a heat ray shielding functional, such as an $LaB_6$ (lanthanum hexafluoride) particle. In addition, examples of the organic dye compound having a heat ray shielding function include a diimonium-based dye, an aminium-based dye, a phthalocyanine-based dye, an anthraquinone-based dye, a polymethine-based dye, a benzene dithiol-type ammonium-based compound, a thiourea derivative, and a thiol metal complex.

Examples of the antiblocking agent include an inorganic particle and an organic particle. Examples of the inorganic particle include particles of oxides, hydroxides, sulfides, nitrides, halides, carbonates, sulfates, acetates, phosphates, phosphites, organic carboxylic acid salts, silicic acid salts, titanic acid salts, and boric acid salts of an element belonging to the Group IA, Group IIA, Group IVA, Group VIA, Group VIIA, Group VIIIA, Group IB, Group IIB, Group IIIB, or Group IVB, as well as hydrates thereof, and composite compounds and natural minerals centering them. Examples of the organic particle include a fluorine resin, a melamine-based resin, a styrene-divinylbenzene copolymer, an acrylic resin silicone, and crosslinked products thereof.

For example, even in the case where the X layer is used for a sound insulator or vibration damping material use, in particular, a sound insulator or vibration damping material use of automobile, the X layer is a layer containing the hydrogenated block copolymer of the present invention, and it may be a layer composed only of the hydrogenated block copolymer of the present invention or may be a layer composed of a composition containing a component other than the hydrogenated block copolymer of the present invention. In the case where the X layer is used for a sound insulator or vibration damping material use, in particular, a sound insulator or vibration damping material use of automobile, examples of the component other than the hydrogenated block copolymer of the present invention include an antioxidant, a UV absorbent, a light stabilizer, a heat insulating material, an antiblocking agent, a pigment, a dye, a softening agent, a crosslinking agent, a crosslinking aid, and a crosslinking promoter, but the component is not particularly limited thereto. These materials can be used either alone or in combination of two or more thereof.

With respect to the antioxidant, the UV absorber, the light stabilizer, the heat insulating material, and the antiblocking agent, the same materials as those described above in the case where the X layer is used as an intermediate film for laminated glass are exemplified.

Examples of the pigment include an organic pigment and an inorganic pigment. Examples of the organic pigment include an azo-based pigment, a quinacridone-based pigment, and a phthalocyanine-based pigment. Examples of the inorganic pigment include titanium oxide, zinc oxide, zinc sulfide, carbon black, a lead-based pigment, a cadmium-based pigment, a cobalt-based pigment, an iron-based pigment, a chromium-based pigment, ultramarine blue, and Prussian blue.

Examples of the dye include an azo-based dye, an anthraquinone-based dye, a phthalocyanine-based dye, a quinacridone-based dye, a perylene-based dye, a dioxazine-based dye, an anthraquinone-based dye, an indolinone-based dye, an isoindolinone-based dye, a quinoneimine-based dye, a triphenylmethane-based dye, a thiazole-based dye, a nitro-based dye, and a nitroso-based dye.

As the softening agent, known softening agents, such as a hydrocarbon-based oil, e.g., a paraffinic hydrocarbon-based oil, a naphthenic hydrocarbon-based oil, and an aromatic hydrocarbon-based oil; a vegetable oil, e.g., peanut oil and rosin; a phosphoric acid ester; low-molecular weight polyethylene glycol; liquid paraffin; and hydrocarbon-based synthetic oils, e.g., low-molecular weight polyethylene, an ethylene-α-olefin copolymer oligomer, liquid polybutene, liquid polyisoprene or a hydrogenation product thereof, and liquid polybutadiene or a hydrogenation product thereof, can be used. These may be used either alone or in combination of two or more thereof.

Examples of the crosslinking agent include a radical generator, sulfur, and a sulfur compound.

Examples of the radical generator include organic peroxides, such as a dialkyl monoperoxide, e.g., dicumyl peroxide, di-t-butyl peroxide, and t-butylcumyl peroxide; a diperoxide, e.g., 2,5-dimethyl-2,5-di(t-butylperoxy)hexane, 2,5-dimethyl-2,5-di(t-butylperoxy)hexyne-3, bis(t-butyldioxyisopropyl)benzene, 1,1-bis(t-butylperoxy)-3,3,5-trimethylcyclohexane, and n-butyl 4,4-bis(t-butylperoxy)valerate; a diacyl peroxide, e.g., benzoyl peroxide, p-chlorobenzoyl peroxide, and 2,4-dichlorobenzoyl peroxide; a monoacylalkyl peroxide, e.g., t-butylperoxy benzoate; a percarbonate, e.g., t-butylperoxyisopropyl carbonate; and a diacyl peroxide, e.g., diacetyl peroxide and lauroyl peroxide. These may be used either alone or in combination of two or more thereof. Above all, 2,5-dimethyl-2,5-di(t-butylperoxy)hexane and dicumyl peroxide are preferred from the viewpoint of reactivity.

Examples of the sulfur compound include sulfur monochloride and sulfur dichloride.

As the crosslinking agent, in addition, a phenol-based resin, such as an alkylphenol resin and a brominated alkylphenol resin; or a combination of p-quinone dioxime and lead dioxide, a combination of p,p'-dibenzoylquinone dioxime and trilead tetroxide, or the like can also be used.

As the crosslinking aid, known crosslinking aids can be used. Examples thereof include polyfunctional monomers, such as trimethylolpropane trimethacrylate, trimethylolpropane triacrylate, triallyl trimellitate, triallyl 1,2,4-benzenetricarboxylate, triallyl isocyanurate, 1,6-hexanediol dimethacrylate, 1,9-nonanediol dimethacrylate, 1,10-decanediol dimethacrylate, polyethylene glycol dimethacrylate, ethylene glycol dimethacrylate, diethylene glycol dimethacrylate, triethylene glycol dimethacrylate, divinylbenzene, glycerol dimethacrylate, and 2-hydroxy-3-acryloyloxypropyl methacrylate; stannous chloride, ferric chloride, organic sulfonic acids, polychloroprene, and chlorosulfonated polyethylene. The crosslinking aid may be used either alone or in combination of two or more thereof.

Examples of the crosslinking promoter include thiazoles, such as N,N-diisopropyl-2-benzothiazole sulfenamide, 2-mercaptobenzothiazole, and 2-(4-morpholinodithio)benzothiazole; guanidines, such as diphenylguanidine and triphenylguanidine; aldehyde-amine-based reaction products or aldehyde-ammonia-based reaction products, such as a butylaldehyde-aniline reaction product and a hexamethylenetetramine-acetaldehyde reaction product; imidazolines, such as 2-mercaptoimidazoline; thioureas, such as thiocarbanilide, diethylurea, dibutylthiourea, trimethylthiourea, and di-ortho-tolylthiourea; dibenzothiazyl disulfide; thiuram monosulfides or thiuram polysulfides, such as tetramethylthiuram monosulfide, tetramethylthiuram disulfide, and pentamethylenethiuram tetrasulfide; thiocarbamates, such as zinc dimethyldithiocarbamate, zinc ethylphenyldithiocarbamate, sodium dimethyldithiocarbamate, selenium dimethyldithiocarbamate, and tellurium diethyldithiocarbamate; xanthogenates, such as zinc dibutylxanthogenate; and zinc oxide. The crosslinking promoter may be used either alone or in combination of two or more thereof.

The hydrogenated block copolymer of the present invention may be used upon being mixed with an additive, such as a crystal nucleating agent; a hydrogenated resin, such as a hydrogenated chroman-indene resin, a hydrogenated rosin-based resin, a hydrogenated terpene resin, and an alicyclic hydrogenated petroleum resin; a tackifier resin, such as an aliphatic resin composed of an olefin or diolefin polymer; hydrogenated polyisoprene, hydrogenated polybutadiene, butyl rubber, polyisobutylene, polybutene, a polyolefin-based elastomer; or other polymer, specifically an ethylene-propylene copolymer, an ethylene-butylene copolymer, a propylene-butylene copolymer, a polyolefin-based resin, an olefin-based polymer, a polyethylene-based resin, or the like, without being particularly limited with respect to its use, so long as the effects of the present invention are not impaired.

Here, examples of the olefin constituting the aforementioned polyolefin-based resin include ethylene, propylene, 1-butene, 1-pentene, 1-hexene, 1-octene, 4-methyl-1-pentene, and cyclohexene. The olefin constituting the polyolefin-based resin may be used either alone or in combination of two or more thereof. In particular, examples of the polypropylene-based resin that is one of the polyolefin-based resins include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. In addition, a modified polypropylene-based resin obtained by graft copolymerizing such a polypropylene-based resin with a modifier, such as an unsaturated monocarboxylic acid, e.g., acrylic acid, methacrylic acid, and crotonic acid; an unsaturated dicarboxylic acid, e.g., maleic acid, citraconic acid, and itaconic acid; an ester, an amide, or an imide of the foregoing unsaturated monocarboxylic acid or unsaturated dicarboxylic acid; and an unsaturated dicarboxylic acid anhydride, e.g., maleic anhydride, citraconic anhydride, and itaconic anhydride can also be used.

The olefin-based polymer is at least one olefin-based polymer selected from the group consisting of an ethylene-propylene-diene copolymer (EPDM) rubber, an ethylene-vinyl acetate copolymer (EVA), and a polyethylene-based resin.

Examples of the diene which can be used as a raw material of the ethylene-propylene-diene copolymer rubber include chain non-conjugated dienes, such as 1,4-hexadiene, 1,6-octadiene, 2-methyl-1,5-hexadiene, 6-methyl-1,6-heptadiene, and 7-methyl-1,6-octadiene; cyclic non-conjugated dienes, such as cyclohexadiene, dichloropentadiene, methyltetrahydroindene, 5-vinylnorbornene, 5-ethylidene-2-norbornene, 5-methyl-2-norbornene, 5-isopropylidene-2-norbornene, and 6-chloromethyl-5-isopropenyl-2-norbornene; and trienes, such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene.

Examples of the polyethylene-based resin include homopolymers of ethylene, such as high-density polyethylene, medium-density polyethylene, and low-density polyethylene; and ethylene-based copolymers, such as an ethylene/butene-1 copolymer, an ethylene/hexene copolymer, an ethylene/heptene copolymer, an ethylene/octene copolymer, an ethylene/4-methylpentene-1 copolymer, an ethylene/vinyl acetate copolymer, an ethylene/acrylic acid copolymer, an ethylene/acrylic acid ester copolymer, an ethylene/methacrylic acid copolymer, and an ethylene/methacrylic acid ester copolymer.

The hydrogenated block copolymer of the present invention may be used upon being mixed with other polymer than those mentioned above, without being particularly limited with respect to its use, so long as the effects of the present invention are not impaired.

Examples of such other polymer include polyphenylene ether-based resins; polyamide-based resins, such as polyamide 6, polyamide 6.6, polyamide 6.10, polyamide 11, polyamide 12, polyamide 6.12, polyhexamethylenediamine terephthalamide, polyhexamethylenediamine isophthalamide, and a xylene group-containing polyamide; polyester-based resins, such as polyethylene terephthalate and polybutylene terephthalate; acrylic resins, such as polymethyl acrylate and polymethyl methacrylate; polyoxymethylene-based resins, such as a polyoxymethylene homopolymer and a polyoxymethylene copolymer; styrene-based resins, such as a styrene homopolymer, an α-methylstyrene homopolymer, an acrylonitrile-styrene resin, and an acrylonitrile-butadiene-styrene resin; a polycarbonate resin; an ethylene-propylene copolymer rubber (EPM); a styrene-butadiene copolymer rubber, a styrene-isoprene copolymer rubber, or a hydrogenation product thereof or a modified product thereof; a natural rubber; a synthetic isoprene rubber, a liquid polyisoprene rubber, and a hydrogenation product or modified product thereof, a chloroprene rubber; an acryl rubber; an acrylonitrile-butadiene rubber; an epichlorohydrin rubber; a silicone rubber; a fluorine rubber; a chlorosulfonated polyethylene; a urethane rubber; a polyurethane-based elastomer; a polyamide-based elastomer; a styrene-based elastomer; a polyester-based elastomer; and a soft polyvinyl chloride resin.

Furthermore, the hydrogenated block copolymer of the present invention may be used upon being mixed with various additives, without being particularly limited with respect to its use. Examples of such an additive include inorganic fillers, such as talc, clay, mica, calcium silicate, glass, glass hollow sphere, glass fiber, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomaceous earth, alumina, titanium oxide, iron oxide, zinc oxide, magnesium oxide, tin oxide, antimony oxide, barium ferrite, strontium ferrite, carbon black, graphite, carbon fiber, active carbon, carbon hollow sphere, calcium titanate, lead zirconate titanate, silicon carbide, and mica; organic fillers, such as wood flour and starch; organic pigments; and an inorganic hollow particle.

The inorganic hollow particle is not particularly limited so long as it is a hollow particle formed of an inorganic material, such as ceramics. As the inorganic hollow particle, at least one selected from a glass balloon, a silica balloon, a Shirasu-balloon, an alumina balloon, a zirconia balloon, and a fly ash balloon is preferred. An average particle diameter of the inorganic hollow particle is suitably in the range of, for example, 30 to 150 μm. The average particle diameter of the inorganic hollow particle is a 50% weight average particle diameter (D50 value) in the cumulative size distribution of particle size determined by the laser light scattering method.

The hydrogenated block copolymer of the present invention may be used upon being mixed with a lubricant, an antistatic agent, a flame retardant, a foaming agent, a water repellent, a waterproof agent, an electroconductivity imparting agent, a thermal conductivity imparting agent, an electromagnetic wave shieldability imparting agent, a fluorescent brightener, or a antimicrobial agent, as the need arises.

Even in the case of a dam rubber, a shoe sole material, a flooring material, or the like, a resin composition containing, together with the hydrogenated block copolymer of the present invention, other material may also be used. Known materials which are used for a dam rubber, a shoe sole material, or a flooring material can be contained without being particularly limited. For example, those containing an olefin-based polymer, a crosslinking agent, a crosslinking aid, a crosslinking promoter, a foaming agent, a foaming aid, a processing aid, a resin of every kind, an additive of every kind, or the like may be used.

The production method of the foregoing resin composition is not particularly limited, and known methods can be adopted. For example, the resin composition can be produced by mixing the hydrogenated block copolymer of the present invention and other material by using a mixing machine, such as a Henschel mixer, a V blender, a ribbon blender, a tumbler blender, and a conical blender, or after thus mixed, the resultant mixture is melt-kneaded with a single-screw extruder, a twin-screw extruder, a kneader, or the like. In addition, in the case of performing foaming, for example, the foamed product can be obtained by performing injection foam molding of the resin composition having a foaming agent dry-blended therein in a die provided with a cavity having a desired shape.

In the case where the X layer is a layer composed of the composition containing a component other than the hydrogenated block copolymer of the present invention, though the content of the hydrogenated block copolymer of the present invention in the composition is not particularly limited, from the viewpoint of damping properties and sound insulation properties, it is preferably 50% by mass or more, more preferably 60% by mass or more, still more preferably 80% by mass or more, especially preferably 90% by mass or more, and most preferably 95% by mass or more.

Though the thickness of the X layer is not particularly limited, it is preferably 10 to 800 μm, more preferably 30 to 500 μm, still more preferably 50 to 500 μm, and especially preferably 70 to 350 μm. In particular, the thickness of the X layer may be 50 to 150 μm and may be 200 to 350 μm.

[Y Layer]

In the laminate of the present invention, though there is no particular limitation, the aforementioned Y layer or at least one of the aforementioned plural Y layers is preferably a glass layer. In this case, the X layer serves as an intermediate film for laminated glass. The thickness of the glass layer (in the case of the plural glass layer, the thickness means a thickness of one layer) is preferably 0.5 to 5 mm, more preferably 0.5 to 3.0 mm, still more preferably 1.0 to 2.5 mm, and especially preferably 1.2 to 1.8 mm. When the thickness of the glass layer is set to 5 mm or less from the viewpoint of weight reduction, the thickness of the glass layer becomes thinner than that of the conventional ones, and therefore, the sound insulation properties are originally liable to be lowered. However, so far as a laminate using the hydrogenated block copolymer of the present invention is concerned, sufficient sound insulation properties are revealed. When the thickness of the glass layer is 0.5 mm or more, sufficient sound insulation properties can be obtained.

The glass which is used for the glass layer is not particularly limited, and examples thereof include inorganic glasses, such as a float plate glass, a polished plate glass, a figured plate glass, a wire net-reinforced plate glass, and a heat ray-absorbing plate glass, and known organic glasses. The glass may be colorless, colored, transparent, translucent, and non-transparent.

In the laminate of the present invention, at least one of the aforementioned plural Y layers may be a layer containing a thermoplastic resin (i) (adhesive auxiliary layer or skin layer) different from the hydrogenated block copolymer of the present invention. In the thermoplastic resin (i), a shear storage modulus (G') at a temperature 25° C. as measured by performing the complex shear viscosity test under a condition at a frequency of 1 Hz in conformity with JIS K7244-10 (2005) is preferably 10 MPa or more, more preferably 15 MPa or more, still more preferably 20 MPa or more, especially preferably 20 to 70 MPa, and most preferably 35 to 55 MPa. In this case, the weather resistance and the strength of the X layer can be reinforced, and the adhesiveness to the aforementioned glass layer can be regulated.

In the case where at least one of the aforementioned plural Y layers is a layer containing the aforementioned thermoplastic resin (i) (adhesive auxiliary layer or skin layer), from the viewpoint of sound insulation properties, the thickness of the aforementioned X layer is preferably 10% or more, more preferably 20% or more, and still more preferably 60% or more of the thickness of the adhesive auxiliary layer, and though an upper limit value thereof is not particularly limited, it is preferably 200% or less, more preferably 160% or less, and still more preferably 130% or less.

The layer containing the thermoplastic resin (i) (adhesive auxiliary layer or skin layer) may be one having an uneven shape on the surface thereof.

Examples of the thermoplastic resin (i) include a polyvinyl acetal resin, an ionomer, an ethylene-vinyl acetate copolymer, a urethane resin, and a polyamide resin. Above all, from the viewpoint of adhesiveness and transparency, a polyvinyl acetal resin and an ionomer are preferred.

(Polyvinyl Acetal Resin)

The polyvinyl acetal resin is a resin having a repeating unit represented by the following formula.

[Chem. 6]

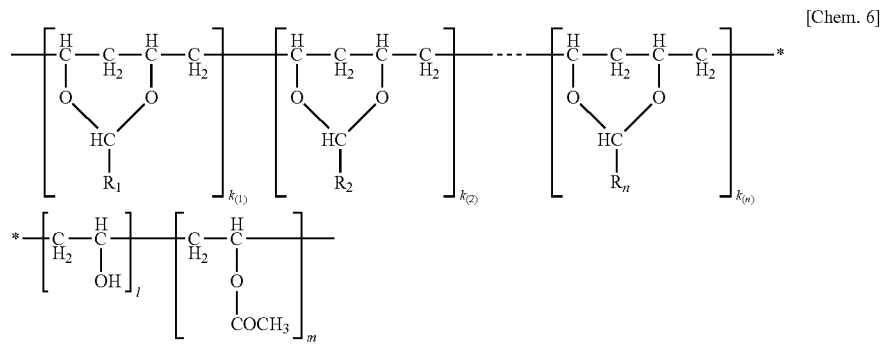

In the aforementioned formula, n represents a number of kinds of aldehydes used for the acetalization reaction; $R_1$, $R_2$, ..., $R_n$ each represent an alkyl residue of the aldehyde used for the acetalization reaction, or a hydrogen atom; $k_{(1)}$, $k_{(2)}$, ..., $k_{(n)}$ each represent a proportion (molar ratio) of the constituent unit expressed by [ ]; l represents a proportion (molar ratio) of the vinyl alcohol unit; and m represents a proportion (molar ratio) of the vinyl acetate unit.

However, $k_{(1)}+k_{(2)}+ \ldots +k_{(n)}+l+m=1$; and any one of $k_{(1)}, k_{(2)}, \ldots, k_{(n)}$, l, and m may be zero.

The respective repeating units are not particularly limited by the aforementioned arrangement order, and they may be arranged in a random form, may be arranged in a block form, or may be arranged in a tapered form.

The production method of the polyvinyl acetal resin is not particularly limited, and known methods, for example, a method described in WO 2012/026501 A, can be adopted.

As the polyvinyl acetal resin, polyvinyl acetal resins described in WO 2012/026501 A can be used, and above all, polyvinyl butyral (PVB) is preferred.

(Ionomer)

Though the ionomer is not particularly limited, examples thereof include resins having a constitutional unit derived from ethylene and a constitutional unit derived from an $\alpha,\beta$-unsaturated carboxylic acid, in which at least a part of the $\alpha,\beta$-unsaturated carboxylic acid is neutralized with a metal ion. Examples of the metal ion include a sodium ion. In the ethylene-$\alpha,\beta$-unsaturated carboxylic acid copolymer serving as a base polymer, though a content proportion of the constitutional unit of the $\alpha,\beta$-unsaturated carboxylic acid is not particularly limited, it is preferably 2% by mass or more, and more preferably 5% by mass or more. In addition, though the content proportion of the constitutional unit of the $\alpha,\beta$-unsaturated carboxylic acid is not particularly limited, it is preferably 30% by mass or less, and more preferably 20% by mass or less.

Examples of the $\alpha,\beta$-unsaturated carboxylic acid constituting the ionomer include acrylic acid, methacrylic acid, maleic acid, monomethyl maleate, monoethyl maleate, and maleic anhydride. Above all, acrylic acid and methacrylic acid are preferred.

In the present invention, from the viewpoint of easiness of availability, an ionomer of an ethylene-acrylic acid copolymer and an ionomer of an ethylene-methacrylic acid copolymer are preferred, and a sodium ionomer of an ethylene-acrylic acid copolymer and a sodium ionomer of an ethylene-methacrylic acid copolymer are more preferred.

In the case where the Y layer is a layer containing the aforementioned thermoplastic resin (i), it may be a layer containing only the aforementioned thermoplastic resin (i) or may be a layer composed of a composition containing a component other than the aforementioned thermoplastic resin (i).

Examples of the component other than the thermoplastic resin (i) include an adhesive strength regulator, a plasticizer, an antioxidant, a UV absorber, a light stabilizer, an antiblocking agent, a pigment, a dye, and a heat insulating material, but the component is not particularly limited thereto. These materials can be used either alone or in combination of two or more thereof.

As the adhesive strength regulator, those disclosed in WO 03/033583 A can also be used. Examples thereof include an alkali metal salt and an alkaline earth metal salt, and more specifically, examples thereof include salts of potassium, sodium, magnesium, or the like. Examples of the aforementioned salt include salts of an organic acid, such as a carboxylic acid, e.g., octanoic acid, hexanoic acid, butyric acid, acetic acid, and formic acid; and an inorganic acid, such as hydrochloric acid and nitric acid.

Though the plasticizer is not particularly limited, a carboxylic acid ester-based plasticizer, such as a monovalent carboxylic acid ester-based plasticizer and a polyvalent carboxylic acid ester-based plasticizer; a phosphoric acid ester-based plasticizer; an organic phosphorous acid ester-based plasticizer; a polymer plasticizer, such as a carboxylic acid polyester-based plasticizer, a carboxylic acid polyester-based plasticizer, and a polyalkylene glycol-based plasticizer; an ester compound of a hydroxycarboxylic acid and a polyhydric alcohol, such as castor oil; and a hydroxycarboxylic acid ester-based plasticizer, such an ester compound of a hydroxycarboxylic acid and a monohydric alcohol can be used.

With respect to the antioxidant, the UV absorber, the light stabilizer, the antiblocking agent, the pigment, the dye, and the heat insulating material, the same description as that described above for the X layer is applicable.

In the case where the Y layer is a layer composed of a composition containing the aforementioned thermoplastic resin (i), though the content of the aforementioned thermoplastic resin (i) in the composition is not particularly limited, from the viewpoint of adhesiveness or the like, it is preferably 50% by mass or more, more preferably 60% by mass or more, still more preferably 80% by mass or more, especially preferably 90% by mass or more, and most preferably 95% by mass or more.

Examples of a more specific preferred embodiment of the laminate of the present invention include a laminate [Y2/Y1/X/Y1/Y2] in which the glass layer, the layer containing the thermoplastic resin (i), the X layer, the layer containing the thermoplastic resin (i), and the glass layer are laminated in this order; and from the viewpoint of rigidity, examples of a more preferred embodiment include a laminate in which the glass layer, the layer containing the ionomer, the X layer, the layer containing the ionomer, and the glass layer are laminated in this order. From the viewpoint of control of adhesion to the glass, examples of a more preferred embodiment include a laminate in which the glass layer, the layer containing PVB, the X layer, the layer containing PVB, and the glass layer are laminated in this order.

The production method of the laminate of the present invention is not particularly limited, and examples thereof include a method of using a vacuum laminator, a method of using a vacuum bag, a method of using a vacuum ring, and a method of using a nip roll. For example, for the production of a laminate [Y1/X/Y1] of a three-layer configuration of layers containing the layer containing the thermoplastic resin (i), the X layer, and the layer containing the thermoplastic resin (i), a nip roll is preferably used. In addition, for example, in the case of laminating the Y2 layer of a laminate [Y2/Y1/X/Y1/Y2] of a five-layer configuration in which the glass layer, the layer containing the thermoplastic resin (i), the X layer, the layer containing the thermoplastic resin (i), and the glass layer are laminated in this order, it is preferred to adopt a vacuum laminator.

The condition under which the nip rolling is performed is not particularly limited, and the laminate can be produced by sandwiching a molded article obtained through co-extrusion at about 180 to 230° C. using an extruder between two rolls, such as a metal mirror surface roll and then taking up at a predetermined taking-up speed. In addition, in the case of using a vacuum laminator, a hot plate temperature is preferably 140 to 190° C., an evacuation time is preferably 6 to 20 minutes, a pressing pressure is preferably 35 to 65 MPa, and a pressing time is preferably 10 to 30 minutes.

Furthermore, when the laminated glass that is one embodiment of the present invention is specifically described, its production method is not particularly limited, and it is possible to produce it by a conventionally known method. Examples thereof include a method of using a vacuum laminator, a method of using a vacuum bag, a method of using a vacuum ring, and a method of using a nip roll. In addition, a method in which after temporary contact bonding, the resultant is placed in an autoclave to achieve primary contact bonding can also be adopted.

In the case of using a vacuum laminator device, lamination can be, for example, achieved under reduced pressure of $1 \times 10^{-6}$ to $3 \times 10^{-2}$ MPa at 100 to 200° C., and especially 130 to 170° C. The method of using a vacuum bag or a vacuum ring is described in, for example, European Patent No. 1235683, and the lamination can be, for example, achieved under a pressure of about $2 \times 10^{-2}$ MPa at 130 to 145° C.

In the case of using a nip roll, for example, there is exemplified a method in which after performing first temporary contact bonding at a temperature of not higher than a flow beginning temperature of the materials of the adhesive auxiliary layer, such as the ionomer and the polyvinyl acetal resin, temporary contact bonding is further performed under a condition close to the flow beginning temperature.

It is preferred to carry out the primary contact bonding by an autoclave, for example, under a pressure of about 1 to 15 MPa at 130 to 155° C. for about 0.5 to 2 hours depending upon the thickness and configuration of the module.

In order to provide the intermediate film for laminated glass of the present invention in the interior of the laminated glass, a laminated glass may be fabricated by gathering glasses having the Y layer applied on the both surfaces of the X layer and laminating them.

As one of preferred uses of the laminate with excellent sound insulation properties of the present invention, a laminated glass is exemplified as mentioned above. Though the foregoing laminated glass is not particularly limited, it is effectively utilized for, for example, a window shield for automobile, a side glass for automobile, a sunroof for automobile, a rear glass for automobile, or a glass for head-up display.

EXAMPLES

The present invention is hereunder described in more detail by reference to Examples, but it should be construed that the present invention is by no means limited by these Examples.

[Each of Components Used in Examples]

A production method of each of the components used in the Examples and Comparative Examples is hereunder described.

[Production Example 1] Production of Hydrogenated Block Copolymer

A nitrogen-purged and dried pressure-resistant container was charged with 50 kg of, as a solvent, cyclohexane and 20 g of a cyclohexane solution of, as an anionic polymerization initiator, sec-butyllithium having a concentration of 10.5% by mass (substantial addition amount of sec-butyllithium: 2.1 g) and further charged with 260 g of, as a Lewis base, tetrahydrofuran.

After subjecting the inside of the pressure-resistant container to temperature rise to 50° C., 0.16 kg of styrene (1) was added and polymerized for 1 hour, 7.8 kg of isoprene was subsequently added and polymerized for 2 hours, and 0.16 kg of styrene (2) was further added and polymerized for 1 hour, thereby obtaining a reaction liquid containing a polystyrene-polyisoprene-polystyrene triblock copolymer.

To the reaction liquid, a Ziegler-based hydrogenation catalyst formed of nickel octylate and trimethylaluminum was added in a hydrogen atmosphere, and reaction was performed under a condition at a hydrogen pressure of 1 MPa and 80° C. for 5 hours. After standing the reaction liquid for cooling and pressure discharge, the aforementioned catalyst was removed by water washing, and the residue was dried in vacuo, thereby obtaining a hydrogenation product of the polystyrene-polyisoprene-polystyrene triblock copolymer (hereinafter sometimes referred to as "TPE-1").

Each of the raw materials and its use amount are summarized in Table 2-1.

[Production Examples 2 to 11 and 13 to 16 and Comparative Production Examples 1 to 5]
Production of Hydrogenated Block Copolymers Hydrogenated block copolymers (TPE-2) to (TPE-11), (TPE-13) to (TPE-16), and (TPE-1') to (TPE-5') were produced in the same manner as in Production Example 1, except that each of the components and its use amount were changed as described in Table 2-1 or Table 2-2.

[Production Example 12] Production of Styrene-Isobutylene-Styrene Triblock Copolymer In a stirrer-equipped reactor, 800 mL of methylene chloride which had been dehydrated and purified with Molecular Sieves 4 A and 1,200 mL of methylcyclohexane which had been similarly dehydrated and purified were charged; 1.3 g (5.4 mmol) of 1,4-bis(1-chloro-1-methylethyl)benzene, 2.4 g (23 mmol) of 2,6-dimethylpyridine, 0.84 g (10.6 mmol) of pyridine, and 210 g of isobutylene were added, respectively; and 7.7 g (41 mmol) of titanium tetrachloride was further added at −78° C., thereby starting polymerization. After the polymerization at −78° C. under stirring for 3 hours, 0.6 g (5.9 mmol) of 2,6-dimethylpyridine and 60 g of styrene were added, thereby further performing polymerization at the same temperature under stirring for 4 hours.

To the resulting reaction mixed liquid, 200 mL of methanol was added to terminate the polymerization reaction. The resulting mixed liquid was washed with water and subsequently re-precipitated in a large amount of methanol, thereby obtaining a styrene-isobutylene-styrene triblock copolymer (TPE-12).

TABLE 2-1

Production of hydrogenated block copolymer

| | | | Production Example | | | | | | | | |
|---|---|---|---|---|---|---|---|---|---|---|---|
| | | | 1 | 2 | 3 | 4 | 5 | 6 | 7 | 8 | 9 |
| | Hydrogenated block copolymer | | TPE-1 | TPE-2 | TPE-3 | TPE-4 | TPE-5 | TPE-6 | TPE-7 | TPE-8 | TPE-9 |
| Use amount (kg) | Cyclohexane | | 50 | 50 | 50 | 50 | 50 | 50 | 50 | 50 | 50 |
| | sec-Butyllithium (10.5% by mass cyclohexane solution) | | 0.020 | 0.020 | 0.020 | 0.028 | 0.054 | 0.076 | 0.111 | 0.082 | 0.130 |
| | (A) | Styrene (1) | 0.16 | 0.16 | 0.16 | 0.38 | 0.75 | 0.50 | 1.00 | 0.50 | 1.70 |
| | | Styrene (2) | 0.16 | 0.16 | 0.16 | 0.38 | 0.75 | 1.50 | 1.00 | 1.50 | 1.70 |

TABLE 2-1-continued

Production of hydrogenated block copolymer

| | | Production Example | | | | | | | | |
|---|---|---|---|---|---|---|---|---|---|---|
| | | 1 | 2 | 3 | 4 | 5 | 6 | 7 | 5 | 9 |
| Hydrogenated block copolymer | | TPE-1 | TPE-2 | TPE-3 | TPE-4 | TPE-5 | TPE-6 | TPE-7 | TPE-8 | TPE-9 |
| (B) | Isoprene | 7.80 | 6.40 | 7.80 | 8.75 | 11.00 | 8.20 | | 8.20 | 13.31 |
| | Butadiene | | | | | | | 6.50 | 14.60 | 6.50 | |
| | Styrene (3) | | 1.40 | | | | | | | |
| Lewis base | Tetrahydrofuran N,N,N',N'-Tetramethyl-ethylenediamine | 0.26 | 0.26 | 0.17 | 0.27 | 0.28 | 0.31 | 0.030 | 0.11 | 0.29 |

The components of the polymer block (B) were used as a mixture.

TABLE 2-2

Production of hydrogenated block copolymer:

| | | Production Example | | | | | | Comparative Production Example | | | | |
|---|---|---|---|---|---|---|---|---|---|---|---|---|
| | | 10 | 11 | 13 | 14 | 15 | 16 | 1 | 2 | 3 | 4 | 5 |
| Hydrogenated block copolymer | | TPE-10 | TPE-11 | TPE-13 | TPE-14 | TPE-15 | TPE-16 | TPE-1' | TPE-2' | TPE-3' | TPE-4' | TPE-5' |
| Use amount (kg) | Cyclohexane | 50 | 50 | 50 | 50 | 50 | 50 | 50 | 50 | 50 | 50 | 50 |
| | sec-Butyllithium (10.5% by mass cyclohexane solution) | 0.125 | 0.101 | 0.060 | 0.075 | 0.020 | 0.020 | 0.186 | 0.217 | 0.075 | 0.020 | 0.020 |
| (A) | Styrene (1) | 1.70 | 1.70 | 0.67 | 1.00 | 0.32 | 0.16 | 2.50 | 2.50 | 1.00 | 0.02 | 1.34 |
| | Styrene (2) | 1.70 | 1.70 | 0.33 | 1.00 | | 0.16 | 2.50 | 2.50 | 1.00 | 0.02 | 1.34 |
| (B) | Isoprene | 11.00 | 13.30 | | | 7.80 | 5.85 | 6.49 | | | 8.10 | 5.44 |
| | Butadiene | | | 15.00 | 3.24 | | | | 5.16 | 11.70 | 1.16 | |
| | Styrene (3) | 2.30 | | 0.67 | 7.24 | | 1.95 | | | 9.34 | | |
| Lewis base | Tetrahydrofuran N,N,N',N'-Tetramethyl-ethylenediamine | 0.29 | 0.065 | 0.020 | 0.11 | 0.26 | 0.26 | | 0.11 | 0.11 | 0.26 | 0.27 |

The components of the polymer block (B) were used as a mixture.

Examples 1 to 16 and Comparative Examples 1 to 5

With respect to the hydrogenated block copolymer obtained in each of the Production Examples and Comparative Production Examples, various physical properties were evaluated according to measurement methods as mentioned later. The results are shown in Tables 3 and 4.

However, in Comparative Example 4, the moldability was low, so that a test sheet for evaluation of the various physical properties could not be prepared. Thus, the evaluation of various physical properties could not be performed.

A laminate (intermediate film for laminated glass) using an ionomer for the Y1 layer [Y1 layer/X layer/Y1 layer] was produced according to the following method; furthermore, a laminate (laminated glass) using a glass for the Y2 layer [Y2 layer/Y1 layer/X layer/Y1 layer/Y2 layer] was produced; and the evaluation of physical properties were performed according to the following methods. The results are also shown in Tables 3 and 4.

(1. Preparation of Intermediate Film for Laminated Glass)

The hydrogenated block copolymer for the X layer was introduced into a T-die (multi-manifold type: width=500 mm) at 205° C. by using a vent type single-screw extruder having a diameter of screw of 50 mm under a condition at a temperature of 210° C. and a discharge rate of 4 kg/hr, and the ionomer for the Y1 layer (SentryGlas (registered trademark) Interlayer, manufactured by Du Pont) was introduced into the foregoing T-die by using a vent type single-screw extruder having a diameter of screw of 65 mm under a condition at a temperature of 205° C. and a discharge rate of 24 kg/hr.

A molded article coextruded from the T-die was nipped by two metal mirror surface rolls, one of which was set to 50° C., with the other being set to 60° C., and taken up at a taking-up speed of 1.2 m/min, thereby molding an intermediate film for laminated glass (760 μm) [laminate 1] having a three-layer configuration of Y1 layer/X layer/Y1 layer (330 μm/100 μm/330 μm).

In addition, an intermediate film for laminated glass (760 μm) [laminate 2] having a three-layer configuration of Y1 layer/X layer/Y1 layer (253 μm/253 μm/253 μm) was molded in the same manner.

(2. Preparation of Laminated Glass)

The aforementioned intermediate film for laminated glass [laminate 1] was sandwiched by two sheets of commercially available clear glasses [FL2 (four-side beveling processed), 300 mm in length×25 mm in width×2.0 mm in thickness, manufactured by Sanshiba Glass Co., Ltd.] and treated with a vacuum laminator ("1522N", manufactured by Nisshinbo Mechatronics Inc.) under a condition at a hot plate temperature of 165° C. for an evacuation time of 12 minutes at a pressing pressure of 50 kPa for a pressing time of 17 minutes, thereby preparing a laminated glass [laminate 3] having a five-layer configuration of Y2 layer/Y1 layer/X layer/Y1 layer/Y2 layer.

In addition, the same operations were performed in the same manner, except for using the laminate 2 in place of the aforementioned laminate 1, thereby by preparing a laminated glass [laminate 4] having a five-layer configuration of Y2 layer/Y1 layer/X layer/Y1 layer/Y2 layer.

<Physical Properties of Hydrogenated Block Copolymer>
(1) Content of Polymer Block (A)

The hydrogenated block copolymer was dissolved in CDCl$_3$ and subjected to $^1$H-NMR measurement [apparatus: "ADVANCE 400 Nano bay" (manufactured by Bruker Corporation), measurement temperature: 50° C.], thereby calculating the content of the polymer block (A) from a peak intensity derived from styrene.

(2) Morphology

The hydrogenated block copolymer was pressurized at a temperature of 230° C. and a pressure of 10 MPa for 3 minutes, thereby preparing a film having a thickness of 1 mm. The film was cut in a desired size to prepare a test piece, which was then subjected to surface shaping with a diamond cutter at a surface shaping temperature of −110° C. A cross section (1 μm in square) of the test piece was observed with a scanning probe microscope (SPM) (manufactured by SII Nano Technology Inc.) at a measurement temperature of 25° C., thereby evaluating the morphology. In the case where the test piece has a microphase-separated structure of any one of a sphere (FIG. 1), a cylinder (FIG. 2), and a lamella (FIG. 3), that is indicated in Tables 3 and 4.

(3) Weight Average Molecular Weight (Mw)

A weight average molecular weight (Mw) of the hydrogenated block copolymer as expressed in terms of polystyrene was determined by means of the gel permeation chromatography (GPC) under the following condition.

(GPC Measurement Apparatus and Measurement Condition)
  Apparatus: GPC apparatus "HLC-8020" (manufactured by Tosoh Corporation)
  Separation columns: "TSKgel GMHXL", "G4000HXL", and "G5000HXL", all of which are manufactured by Tosoh Corporation, were connected in series with each other.
  Eluent: Tetrahydrofuran
  Eluent flow rate: 1.0 mL/min
  Sample concentration: 5 mg/10 mL
  Column temperature: 40° C.
  Detector: Differential refractive index (RI) detector
  Calibration curve: Prepared using standard polystyrene (4) Hydrogenation Rate of Hydrogenated Block Copolymer A hydrogenation rate was determined through the $^1$H-NMR measurement.
  Apparatus: Nuclear magnetic resonator "ADVANCE 400 Nano Bay" (manufactured by Bruker Corporation)
  Solvent: Deuterated chloroform (5) Average Methylene Chain Length An average methylene chain length was calculated from the monomer species as well as a total value of the contents of the 1,2-bond and the 3,4-bond (vinyl bond amount) on the basis of the aforementioned description.

(6) Average Substituent Constant of Side Chain

An average substituent constant of side chain was calculated from the monomer species as well as a total value of the contents of the 1,2-bond and the 3,4-bond (vinyl bond amount) on the basis of the aforementioned description.

(7) Vinyl Bond Amount of Polymer Block (B)

The block copolymer prior to hydrogenation was dissolved in CDCl$_3$ and subjected to $^1$H-NMR measurement [apparatus: "ADVANCE 400 Nano bay" (manufactured by Bruker Corporation), measurement temperature: 50° C.]. A vinyl bond amount (the total of the contents of the 3,4-bond unit and the 1,2-bond unit) was calculated from a ratio of the total peak area of the structural unit derived from isoprene and/or butadiene to the peak area corresponding to the 3,4-bond unit and the 1,2-bond unit in the isoprene structural unit, the 1,2-bond unit in the butadiene structural unit, or the aforementioned respective bond units in the case of the structural unit derived from a mixture of isoprene and butadiene.

(8-1) Peak Top Temperature and Peak Top Intensity of Tan δ, and Storage Modulus (G') at ((Peak Top Temperature of Tan δ)+30° C.)

For the following measurement, by pressurizing the hydrogenated block copolymer at a temperature of 230° C. and a pressure of 10 MPa for 3 minutes, a single-layer sheet having a thickness of 1.0 mm was prepared. The single-layer sheet was cut out in a disk shape, to provide a test sheet.

For the measurement, a strain-controlled dynamic viscoelasticity apparatus having a diameter of disk of 8 mm, "ARES-G2" (manufactured by TA Instruments Japan Inc.) was used as a parallel-plate oscillatory rheometer on the basis of JIS K7244-10 (2005).

A gap between two flat plates was completely filled with the aforementioned test sheet, an oscillation was given to the aforementioned test sheet at a strain amount of 0.1% and a frequency of 1 Hz, and the temperature was raised from −70° C. to 200° C. at a constant rate of 3° C./min. The temperature of each of the aforementioned test sheet and the disk was kept until the measured values of shear loss modulus and shear storage modulus did not change, thereby determining a storage modulus (G') of the hydrogenated block copolymer, a maximum value of peak intensity of tan δ (peak top intensity), and a temperature obtained from the maximum value (peak top temperature). In addition, a storage modulus (G') at ((peak top temperature of tan δ)+30° C.) was determined.

(8-2) Minimum Value of d(G')/dTemp.

The storage modulus (G') measured in the above (8-1) was used to define a storage modulus G'(T) at a certain temperature (T) and a storage modulus G'(T+dT) at a point at which the temperature war raised by a minute amount (dT); d(G')/dTemp.=(G'(T+dT)−G'(T))/dT was calculated from the foregoing values; and a minimum value of d(G')/dTemp. from T=−70° C. to T=200° C. was determined.

(9) Shrinkage Factor in MD Direction

After stationarily placing a ribbon sheet (MD/TD=4.0 cm/3.5 cm, thickness=1 mm) obtained by extrusion molding the hydrogenated block copolymer obtained in each of the Production Examples under an unstretched condition at 230° C. on talc at 230° C. for one week, when the length in the MD direction is taken as y, and an initial length (4.0 cm) in the MD direction is taken as x, the shrinkage factor in the MD direction was determined according to the formula: {(x−y)/x}×100(%).

(10) Shear Storage Modulus (G') of Y Layer

By pressurizing the ionomer at a temperature of 230° C. and a pressure of 10 MPa for 3 minutes, a single-layer sheet having a thickness of 1.0 mm was prepared. The single-layer sheet was cut out in a disk shape, to provide a test sheet.

A strain-controlled dynamic viscoelasticity apparatus having a diameter of disk of 8 mm, "ARES-G2" (manufactured by TA Instruments Japan Inc.) was used as a parallel-plate oscillatory rheometer on the basis of JIS K7244-10.

A gap between two flat plates was completely filled with the aforementioned test sheet, an oscillation was given to the aforementioned test sheet at a strain amount of 0.1% and a frequency of 1 Hz, and the temperature was raised from −40° C. to 100° C. at a constant rate of 3° C./min. The temperature of each of the aforementioned test sheet and the disk was kept until the measured values of shear loss modulus and shear storage modulus did not change, thereby measuring a shear storage modulus (G') of the Y layer.

<Determination of I Value>

[1] A peak top frequency of tan δ of the hydrogenated block copolymer and a bending stiffness per unit width and a surface density (kg/m$^2$) of the laminate were measured according to the following measurement methods, and an I value was then calculated from the measured values.

[1-1] Peak Top Frequency of Tan δ of Hydrogenated Block Copolymer

By using a test piece (thickness: 1.0 mm) prepared in the same manner as in the measurement of the above "(8) Peak Top Temperature of Peak Top Strength of tan", a master curve calculated by the WLF method was prepared on the basis of measured values as measured at a strain amount of 0.1%, a frequency of 1 to 100 Hz, and a measurement temperature of 20° C., 10° C., 0° C., −10° C., and −30° C., respectively in conformity of JIS K7244-10 (2005), and the peak top frequency of the hydrogenated block copolymer was calculated.

Furthermore, in the aforementioned method, the measurement was performed in the same manner, except for setting the measurement temperature to 20° C. and setting the frequency to 1 to 1,000,000 Hz, thereby preparing graphs each expressing a relation between the frequency and tan δ. The prepared graphs are shown as (b) in FIGS. 4 to 23.

[1-2] Bending Stiffness (B: Pa·m$^3$) Per Unit Width of Laminate (Laminated Glass)

A central portion of the laminate (laminated glass) 3 or 4 obtained in each Example was fixed to a tip portion of an exciting force detector built in an impedance head of an exciter (power amplifier/model 371-A) of a mechanical impedance instrument (manufactured by Ono Sokki Co., Ltd., mass cancel amplifier: MA-5500, channel data station: DS-2100). A vibration was given to the central portion of the aforementioned laminate at a frequency in the range of from 0 to 8,000 Hz. An exciting force and an acceleration waveform at this point were detected, thereby performing a damping test of the laminate (laminated glass) 3 or 4 by the central exciting method.

A mechanical impedance at an exciting point (the central portion of the laminate to which a vibration had been given) was determined on the basis of the obtained exciting force and a speed signal obtained by integrating an acceleration signal; and in an impedance curve obtained by setting the frequency on the abscissa and the mechanical impedance on the ordinate, respectively, a bending stiffness (Pa·m$^3$) per unit width of the laminate (laminated glass) 3 or 4 was calculated from the frequency expressing the peak.

[1-3] Surface Density (m: Kg/m$^2$) of Laminate (Laminated Glass)

A mass of the laminate (laminated glass) 3 or 4 obtained in each Example was measured and divided by a surface area (length: 300×10$^{-3}$ m, width: 25×10$^{-3}$ m), thereby determining a mass per unit area of the laminate (laminated glass) 3 or 4, namely a surface area.

[2] Sound Transmission Loss (STL) of Laminate (Laminated Glass)

A central portion of the laminate (laminated glass) 3 or 4 obtained in each Example was fixed to a tip portion of an exciting force detector built in an impedance head of an exciter (power amplifier/model 371-A) of a mechanical impedance instrument (manufactured by Ono Sokki Co., Ltd., mass cancel amplifier: MA-5500, channel data station: DS-2100). A vibration was given to the central portion of the aforementioned laminate at a frequency in the range of from 0 to 8,000 Hz. An exciting force and an acceleration waveform at this point were detected, thereby performing a damping test of the laminate (laminated glass) 3 or 4 by the central exciting method.

A mechanical impedance at an exciting point (the central portion of the laminate to which a vibration had been given) was determined on the basis of the obtained exciting force and a speed signal obtained by integrating an acceleration signal; and in an impedance curve obtained by setting the frequency on the abscissa and the mechanical impedance on the ordinate, respectively, loss factor of the laminate (laminated glass) 3 or 4 was calculated from the frequency expressing the peak and the half width at half maximum.

Furthermore, by using the loss factor and the bending stiffness per unit width at the tertiary resonance frequency, graphs each expressing a relation between a frequency and a sound transmission loss (STL) at 20° C. were prepared in conformity of ISO 16940 (2008). The prepared graphs are shown as (a) in FIGS. 4 to 23. In the drawings, the wording "330 μm/100 μm/330 μm" refers to the graph of the laminate 3, and the wording "253 μm/253 μm/253 μm" refers to the graph of the laminate 4.

A coincidence critical frequency (frequency at which a lowering of STL starts to occur due to the coincidence effect) was determined from each of the obtained graphs of STL.

In addition, the wording "(STL calculated from the mass law (in the case of supposing that no coincidence effect is present) at the frequency (coincidence frequency) at which the STL is most lowered due to the coincidence effect)− (actual STL)" was defined as ΔSTL. It may be said that as the ΔSTL is smaller, the lowering of STL to be caused due to the coincidence effect can be more likely suppressed, so that the lowering of the sound insulation properties can be effectively suppressed. STL calculated from the mass law is corresponding to STL when the loss factor is 1 in ISO 16940 (2008).

TABLE 3

| | | Example | | | | |
|---|---|---|---|---|---|---|
| | | 1 | 2 | 3 | 4 | 5 |
| Hydrogenated block copolymer used | | TPE-1 | TPE-2 | TPE-3 | TPE-4 | TPE-5 |
| Physical properties of hydrogenated block copolymer used in X layer | Structural unit of polymer block (A) | St | St | St | St | St |
| | Components constituting polymer block (B) | Ip | Ip/St | Ip | Ip | Ip |
| | Mass ratio of components constituting polymer block (B) | 100 | 82.5/17.5 | 100 | 100 | 100 |
| | Molar ratio of components constituting polymer block (B) | 100 | 88/12 | 100 | 100 | 100 |
| | Polymer structure | A/B/A | A/B/A | A/B/A | A/B/A | A/B/A |
| | Content of polymer block (A) (% by mass) | 4 | 4 | 4 | 8 | 12 |

TABLE 3-continued

|  |  | | | | | |
|---|---|---|---|---|---|---|
|  | Morphology of hydrogenated block copolymer | Sphere | Sphere | Sphere | Sphere | Sphere |
|  | Weight average molecular weight of hydrogenated block copolymer | 373,000 | 385,000 | 368,000 | 210,000 | 175,000 |
|  | Hydrogenation rate in polymer block (B) (mol %) | 92 | 90 | 90 | 91 | 91 |
|  | Average methylene chain length in polymer block (B) | 1.9 | 1.7 | 2 | 1.8 | 1.8 |
|  | Average substituent constant of side chain in polymer block (B) | 0.46 | 0.48 | 0.43 | 0.46 | 0.46 |
|  | Vinyl bond amount in polymer block (B) (mol %) | 57 | 60 | 50 | 58 | 58 |
|  | Peak top temperature of tanδ (° C.) | −11.1 | 3 | −20 | −10 | −8.5 |
|  | Peak top intensity of tanδ | 2.7 | 2.4 | 2.4 | 2.6 | 2.5 |
|  | G' at ((peak top temperature of tanδ) 30° C.) (MPa) | 0.4 | 0.4 | 0.4 | 0.4 | 0.4 |
|  | Minimum value of d(G')/dTemp. (MPa/° C.) | −46 | −41 | −40 | −45 | −44 |
|  | Shrinkage factor in MD direction (%) | 2.4 | 2.5 | 2.3 | 2.6 | 5.1 |
|  | Shear storage modulus G' of Y layer (MPa) | 43.2 | 43.2 | 43.2 | 43.2 | 43.2 |
| Physical properties of laminate 3 | I value (330 μm/100 μm/330 μm) | 37,100 | 2,430 | 113,000 | 32,400 | 28,500 |
|  | Peak top frequency of tanδ of hydrogenated block copolymer (Hz) | 8,300 | 450 | 32,400 | 7,500 | 6,760 |
|  | Bending stiffness B per unit width (Pa·m$^3$) (330 μm/100 μm/330 μm) | 198 | 287 | 120 | 185 | 173 |
|  | Surface density m (kg/m$^2$) (330 μm/100 μm/330 μm) | 9.9 | 9.8 | 9.8 | 9.9 | 9.7 |
|  | Coincidence critical frequency (330 μm/100 μm/330 μm) | 4100 | 3400 | 5300 | 4300 | 4400 |
|  | STL (dB) (4,000 Hz, (330 μm/100 μm/330 μm)) | 38.6 | 33.5 | 40.3 | 38.1 | 40.3 |
|  | STL (dB) (6,300 Hz, (330 μm/100 μm/330 μm)) | 42.7 | 42.5 | 42.5 | 44.9 | 45.3 |
|  | ΔSTL (330 μm/100 μm/330 μm) | 9.4 | 9.1 | 7.3 | 5.3 | 5.2 |
| Physical properties of laminate 4 | I value (253 μm/253 μm/253 μm) | 33,500 | 2,300 | 101,000 | 30,700 | 28,100 |
|  | Peak top frequency of tanδ of hydrogenated block copolymer (Hz) | 8,300 | 450 | 32,400 | 7,500 | 6,760 |
|  | Bending stiffness B per unit width (Pa·m$^3$) (253 μm/253 μm/253 μm) | 158 | 256 | 95 | 165 | 171 |
|  | Surface density m (kg/m$^2$) (253 μm/253 μm/253 μm) | 9.7 | 9.8 | 9.8 | 9.9 | 9.9 |
|  | Coincidence critical frequency (253 μm/253 μm/253 μm) | 4600 | 3600 | 5900 | 4500 | 4400 |
|  | STL (dB) (4,000 Hz, (253 μm/253 μm/253 μm)) | 39.9 | 34.3 | 38.7 | 38.6 | 40.0 |
|  | STL (dB) (6,300 Hz, (253 μm/253 μm/253 μm)) | 41.2 | 43.3 | 41.3 | 44.4 | 44.4 |
|  | ΔSTL (253 μm/253 μm/253 μm) | 8.6 | 8.3 | 11.1 | 5.8 | 5.9 |

|  |  | Example | | | |
|---|---|---|---|---|---|
|  |  | 6 | 7 | 8 | 9 |
|  | Hydrogenated block copolymer used | TPE-6 | TPE-7 | TPE-8 | TPE-9 |
| Physical properties of hydrogenated block copolymer used in X layer | Structural unit of polymer block (A) | St | St | St | St |
|  | Components constituting polymer block (B) | Ip/Bd | Bd | Ip/Bd | Ip |
|  | Mass ratio of components constituting polymer block (B) | 56/44 | 100 | 56/44 | 100 |
|  | Molar ratio of components constituting polymer block (B) | 50/50 | 100 | 50/50 | 100 |
|  | Polymer structure | A/B/A | A/B/A | A/B/A | A/B/A |
|  | Content of polymer block (A) (% by mass) | 12 | 12 | 12 | 20 |
|  | Morphology of hydrogenated block copolymer | Sphere | Sphere | Sphere | Cylinder |
|  | Weight average molecular weight of hydrogenated block copolymer | 163,000 | 172,000 | 160,000 | 103,000 |
|  | Hydrogenation rate in polymer block (B) (mol %) | 92 | 99 | 95 | 88 |
|  | Average methylene chain length in polymer block (B) | 2.3 | 2.2 | 3.2 | 1.8 |
|  | Average substituent constant of side chain in polymer block (B) | 0.37 | 0.35 | 0.29 | 0.47 |
|  | Vinyl bond amount in polymer block (B) (mol %) | 64 | 77 | 47 | 60 |

TABLE 3-continued

|  |  |  |  |  |  |
|---|---|---|---|---|---|
|  | Peak top temperature of tanδ (° C.) | −21 | −34.3 | −38.3 | −4.5 |
|  | Peak top intensity of tanδ | 2.2 | 2.1 | 1.9 | 2.2 |
|  | G' at ((peak top temperature of tanδ) 30° C.) (MPa) | 0.7 | 0.6 | 0.9 | 0.6 |
|  | Minimum value of d(G')/dTemp. (MPa/° C.) | −39 | −31 | −32 | −36 |
|  | Shrinkage factor in MD direction (%) | 5.1 | 5.3 | 5.2 | 17.6 |
|  | Shear storage modulus G' of Y layer (MPa) | 43.2 | 43.2 | 43.2 | 43.2 |
| Physical properties of laminate 3 | I value (330 μm/100 μm/330 μm) | 138,000 | 649,000 | 1,470,000 | 10,200 |
|  | Peak top frequency of tanδ of hydrogenated block copolymer (Hz) | 40,000 | 180,000 | 430,000 | 1,780 |
|  | Bending stiffness B per unit width (Pa · m³) (330 μm/100 μm/330 μm) | 117 | 126 | 114 | 331 |
|  | Surface density m (kg/m²) (330 μm/100 μm/330 μm) | 9.8 | 9.7 | 9.8 | 10.0 |
|  | Coincidence critical frequency (330 μm/100 μm/330 μm) | 5300 | 5100 | 5400 | 3200 |
|  | STL (dB) (4,000 Hz, (330 μm/100 μm/330 μm)) | 41.7 | 41.2 | 41.7 | 28.8 |
|  | STL (dB) (6,300 Hz, (330 μm/100 μm/330 μm)) | 40.1 | 38.0 | 35.9 | 46.0 |
|  | ΔSTL (330 μm/100 μm/330 μm) | 9.7 | 11.7 | 13.9 | 13.8 |
| Physical properties of laminate 4 | I value (253 μm/253 μm/253 μm) | 121,000 | 545,000 | 1,330,000 | 8,240 |
|  | Peak top frequency of tanδ of hydrogenated block copolymer (Hz) | 40,000 | 180,000 | 430,000 | 1,780 |
|  | Bending stiffness B per unit width (Pa · m³) (253 μm/253 μm/253 μm) | 90 | 90 | 95 | 211 |
|  | Surface density m (kg/m²) (253 μm/253 μm/253 μm) | 9.9 | 9.8 | 9.9 | 9.9 |
|  | Coincidence critical frequency (253 μm/253 μm/253 μm) | 6100 | 6100 | 5900 | 4000 |
|  | STL (dB) (4,000 Hz, (253 μm/253 μm/253 μm)) | 42.4 | 42.1 | 42.2 | 39.2 |
|  | STL (dB) (6,300 Hz, (253 μm/253 μm/253 μm)) | 40.6 | 39.8 | 39.1 | 46.3 |
|  | ΔSTL (253 μm/253 μm/253 μm) | 15.1 | 15.7 | 18.6 | 5.7 |

TABLE 4

|  |  | Example | | | | | | |
|---|---|---|---|---|---|---|---|---|
|  |  | 10 | 11 | 12 | 13 | 14 | 15 | 16 |
|  | Hydrogenated block copolymer used | TPE-10 | TPE-11 | TPE-12 | TPE-13 | TPE-14 | TPE-15 | TPE-16 |
| Physical properties of hydrogenated block copolymer used in X layer | Structural unit of polymer block (A) | St | St | St | St | St | St | St |
|  | Components constituting polymer block (B) | Ip/St | Ip | IB | Bd/St | Bd/St | Ip | Ip/St |
|  | Mass ratio of components constituting polymer block (B) | 82.5/17.5 | 100 | 100 | 96/4 | 69/31 | 100 | 75/25 |
|  | Molar ratio of components constituting polymer block (B) | 88/12 | 100 | 100 | 98/2 | 81/19 | 100 | 82/18 |
|  | Polymer structure | A/B/A | A/B/A | A/B/A | A/B/A | A/B/A | A/B | A/B/A |
|  | Content of polymer block (A) (% by mass) | 20 | 20 | 20 | 6 | 16 | 4 | 4 |
|  | Morphology of hydrogenated block copolymer | Cylinder | Cylinder | Cylinder | Sphere | Cylinder | Sphere | Sphere |
|  | Weight average molecular weight of hydrogenated block copolymer | 121,000 | 135,000 | 80,000 | 269,000 | 127,000 | 375,000 | 390,000 |
|  | Hydrogenation rate in polymer block (B) (mol %) | 90 | 85 | — | 98 | 98 | 92 | 90 |
|  | Average methylene chain length in polymer block (B) | 1.7 | 1.5 | 1 | 2.5 | 4.8 | 1.9 | 1.7 |
|  | Average substituent constant of side chain in polymer block (B) | 0.48 | 0.55 | 1.04 | 0.32 | 0.19 | 0.46 | 0.48 |
|  | Vinyl bond amount in polymer block (B) (mol %) | 57 | 74 | — | 72 | 40 | 57 | 58 |
|  | Peak top temperature of tanδ (° C.) | 3.1 | 22.4 | −34.9 | −27.6 | −30.2 | −10.4 | 8.4 |
|  | Peak top intensity of tanδ | 2.1 | 1.6 | 1.39 | 1.39 | 1.29 | 2.6 | 2.4 |
|  | G' at ((peak top temperature of tanδ) + 30° C.) (MPa) | 1.0 | 0.6 | 1.0 | 0.6 | 1.3 | 0.4 | 0.6 |
|  | Minimum value of d(G')/dTemp. (MPa/° C.) | −45 | −25 | −25 | −15 | −25 | −44 | −45 |

TABLE 4-continued

|  |  |  |  |  |  |  |  |
|---|---|---|---|---|---|---|---|
|  | Shrinkage factor in MD direction (%) | 19.5 | 18.5 | 18.8 | 2.6 | 15.8 | 2.4 | 2.7 |
|  | Shear storage modulus G' of Y layer (MPa) | 43.2 | 43.2 | 43.2 | 43.2 | 43.2 | 43.2 | 43.3 |
| Physical properties of laminate 3 | I value (330 μm/100 μm/330 μm) | 2,280 | 5 | 51,140 | 234,680 | 1,439,610 | 45,380 | 180 |
|  | Peak top frequency of tanδ of hydrogenated block copolymer (Hz) | 380 | 0.9 | 15,670 | 62,220 | 400,000 | 9,000 | 30 |
|  | Bending stiffness B per unit width (Pa·m$^3$) (330 μm/100 μm/330 μm) | 352 | 360 | 104 | 139 | 127 | 239 | 323 |
|  | Surface density m (kg/m$^2$) (330 μm/100 μm/330 μm) | 9.8 | 9.8 | 9.8 | 9.8 | 9.8 | 9.4 | 9.5 |
|  | Coincidence critical frequency (330 μm/100 μm/330 μm) | 3100 | 3000 | 5600 | 4900 | 5100 | 3600 | 3200 |
|  | STL (dB) (4,000 Hz, (330 μm/100 μm/330 μm)) | 24.9 | 30.5 | 40.7 | 38.5 | 39.3 | 35.5 | 26.3 |
|  | STL (dB) (6,300 Hz, (330 μm/100 μm/330 μm)) | 44.0 | 38.7 | 36.6 | 36.8 | 35.2 | 45.2 | 36.0 |
|  | ΔSTL (330 μm/100 μm/330 μm) | 17.7 | 15.3 | 13.2 | 14.0 | 14.6 | 8.8 | 16.3 |
| Physical properties of laminate 4 | I value (253 μm/253 μm/253 μm) | 2,240 | 5 | 42,000 | 204,760 | 1,234,940 | 42,010 | 180 |
|  | Peak top frequency of tanδ of hydrogenated block copolymer (Hz) | 380 | 0.9 | 15,670 | 62,220 | 400,000 | 9,000 | 30 |
|  | Bending stiffness B per unit width (Pa·m$^3$) (253 μm/253 μm/253 μm) | 340 | 332 | 100 | 106 | 93 | 207 | 330 |
|  | Surface density m (kg/m$^2$) (253 μm/253 μm/253 μm) | 9.8 | 9.8 | 9.8 | 9.8 | 9.8 | 9.5 | 9.7 |
|  | Coincidence critical frequency (253 μm/253 μm/253 μm) | 3100 | 3200 | 5800 | 5600 | 6000 | 3900 | 3200 |
|  | STL (dB) (4,000 Hz, (253 μm/253 μm/253 μm)) | 31.4 | 30.3 | 42.2 | 40.6 | 41.2 | 37.7 | 31.7 |
|  | STL (dB) (6,300 Hz, (253 μm/253 μm/253 μm)) | 47.9 | 37.5 | 39.2 | 33.6 | 31.1 | 44.3 | 40.4 |
|  | ΔSTL (253 μm/253 μm/253 μm) | 11.2 | 15.3 | 15.5 | 16.1 | 18.7 | 8.5 | 12.0 |

|  |  | Comparative Example | | | | |
|---|---|---|---|---|---|---|
|  | Hydrogenated block copolymer used | 1 TPE-1' | 2 TPE-2' | 3 TPE-3' | 4 TPE-4' | 5 TPE-5' |
| Physical properties of hydrogenated block copolymer used in X layer | Structural unit of polymer block (A) | St | St | St | St | St |
|  | Components constituting polymer block (B) | Ip/Bd | Bd | Bd/St | Ip | Ip |
|  | Mass ratio of components constituting polymer block (B) | 56/44 | 100 | 11/89 | 100 | 100 |
|  | Molar ratio of components constituting polymer block (B) | 50/50 | 100 | 20/80 | 100 | 100 |
|  | Polymer structure | A/B/A | A/B/A | A/B/A | A/B/A | A/B/A |
|  | Content of polymer block (A) (% by mass) | 30 | 30 | 30 | 0.5 | 33 |
|  | Morphology of hydrogenated block copolymer | Cylinder | Cylinder | Cylinder | — | Cylinder |
|  | Weight average molecular weight of hydrogenated block copolymer | 92,000 | 77,000 | 100,000 | 380,000 | 310,000 |
|  | Hydrogenation rate in polymer block (B) (mol %) | 98 | 98 | 98 | 90 | 90 |
|  | Average methylene chain length in polymer block (B) | 6.4 | 7 | 1.5 | 1.8 | 1.8 |
|  | Average substituent constant of side chain in polymer block (B) | 0.15 | 0.13 | 0.55 | 0.47 | 0.46 |
|  | Vinyl bond amount in polymer block (B) (mol %) | 6 | 38 | 40 | 60 | 58 |
|  | Peak top temperature of tanδ (° C.) | −49.5 | −47 | 60 | — | −8.9 |
|  | Peak top intensity of tanδ | 0.4 | 0.4 | 0.2 | — | 0.98 |
|  | G' at ((peak top temperature of tanδ) + 30° C.) (MPa) | 9.4 | 14 | 20 | — | 14 |
|  | Minimum value of d(G')/dTemp. (MPa/° C.) | −22 | −16 | −10 | — | −7 |
|  | Shrinkage factor in MD direction (%) | 16.8 | 17.2 | 19.5 | — | 20.3 |
|  | Shear storage modulus G' of Y layer (MPa) | 43.2 | 43.2 | 43.2 | — | 43.2 |
| Physical properties of laminate 3 | I value (330 μm/100 μm/330 μm) | 28,900,000,000 | 540,000,000 | 0.0896 | — | 15,700 |
|  | Peak top frequency of tanδ of hydrogenated block copolymer (Hz) | 7,830,000,000 | 142,000,000 | 0.0150 | — | 2,600 |
|  | Bending stiffness B per unit width (Pa·m$^3$) (330 μm/100 μm/330 μm) | 135 | 140 | 350 | — | 350 |
|  | Surface density m (kg/m$^2$) (330 μm/100 μm/330 μm) | 9.9 | 9.7 | 9.8 | — | 9.6 |

TABLE 4-continued

| | | | | | | |
|---|---|---|---|---|---|---|
| | Coincidence critical frequency (330 μm/100 μm/330 μm) | 5000 | 4800 | 3100 | — | 3000 |
| | STL (dB) (4,000 Hz, (330 μm/100 μm/330 μm)) | 38.7 | 38.3 | 26.8 | — | 31.0 |
| | STL (dB) (6,300 Hz, (330 μm/100 μm/330 μm)) | 31.6 | 31.9 | 36.4 | — | 39.5 |
| | ΔSTL (330 μm/100 μm/330 μm) | 19.3 | 20.1 | 18.8 | — | 14.4 |
| Physical properties of laminate 4 | I value (253 μm/253 μm/253 μm) | 25,000,000,000 | 462,000,000 | 0.09 | — | 14,110 |
| | Peak top frequency of tan δ of hydrogenated block copolymer (Hz) | 7,830,000,000 | 142,000,000 | 0.015 | — | 2,600 |
| | Bending stiffness B per unit width (Pa · m$^3$) (253 μm/253 μm/253 μm) | 100 | 105 | 340 | — | 280 |
| | Surface density m (kg/m$^2$) (253 μm/253 μm/253 μm) | 9.8 | 9.9 | 9.8 | — | 9.5 |
| | Coincidence critical frequency (253 μm/253 μm/253 μm) | 5800 | 5600 | 3100 | — | 3400 |
| | STL (dB) (4,000 Hz, (253 μm/253 μm/253 μm)) | 40.9 | 40.6 | 26.8 | — | 30.4 |
| | STL (dB) (6,300 Hz, (253 μm/253 μm/253 μm)) | 28.9 | 29.4 | 34.4 | — | 39.8 |
| | ΔSTL (253 μm/253 μm/253 μm) | 20.9 | 20.4 | 18.5 | — | 12.2 |

<Description of Abbreviations in Tables 3 and 4>
St: Styrene
Bd: Butadiene
Ip: Isoprene
IB: Isobutylene As is clear from the results shown in Tables 3 and 4 and FIGS. 4 to 23, in Examples 1 to 16, a plenty of products are small in the shrinkage factor in the MD direction of the intermediate film for laminated glass (also low in the shrinking properties) and large in the peak top intensity of tan δ as compared with Comparative Examples 1 to 3 and 5. Furthermore, with respect to the laminates 3 and 4, in a plenty of the Examples, the I value falls within the range of from 200 to 2,000,000, and therefore, the coincidence critical frequency and the peak top frequency of tan δ exhibit a value close to each other, and it is noted that the lowering of the sound insulation properties due to a lowering of STL to be caused due to the coincidence effect is effectively suppressed. In particular, in Examples 1 to 5, 9, and 15, the lowering of the sound insulation properties due to a lowering of STL to be caused due to the coincidence effect is more effectively suppressed.

In addition, in Examples 3, 6 to 8, and 12 to 14, the coincidence critical frequency is increased, and it may be said that the sound insulation properties in a low frequency region (for example, 4,000 Hz or less) is much more excellent.

INDUSTRIAL APPLICABILITY

The hydrogenated block copolymer of the present invention is able to enhance the sound insulation properties in laminated glasses of any thickness, and therefore, it is useful as a vibration damping material, a sound insulator, an intermediate film for laminated glass, a dam rubber, a shoe sole material, a flooring material, and so on. Furthermore, the hydrogenated block copolymer of the present invention can also be used for weather strip, a floor mat, and so on.

In addition, the hydrogenated block copolymer of the present invention can be utilized for a sealing material, an adhesive, a pressure-sensitive adhesive, a packing material, an O-ring, a belt, a soundproof material, and so on in various recorders in the field of household electrical appliance, such as a Blu-ray recorder and an HDD recorder; and in various electrical products, such as a projector, a game player, a digital camera, a home video recorder, an antenna, a speaker, an electronic dictionary, an IC recorder, a fax machine, a copying machine, a telephone, an intercom, a rice cooker, a microwave oven, a multifunction microwave oven, a refrigerator, a dishwasher, a dish dryer, an IH cooking heater, a hot plate, a vacuum cleaner, a washing machine, a battery charger, a sewing machine, an iron, a drier, a power-assisted bicycle, an air cleaner, a water purifier, an electric toothbrush, lighting equipment, an air conditioner, an outdoor unit of air conditioner, a dehumidifier, and a humidifier.

REFERENCE SIGNS LIST

1: Polymer block (A)
2: Polymer block (B)

The invention claimed is:
1. A laminate comprising:
an X layer comprising a hydrogenated block copolymer; and
a plurality of Y layers laminated on at least one surface of the X layer; wherein
the hydrogenated block copolymer is a hydrogenation product of a block copolymer comprising a polymer block (A) consisting of a structural unit derived from an aromatic vinyl compound and a polymer block (B) containing 30 mol % or more of a structural unit derived from at least one selected from the group consisting of a conjugated diene compound and isobutylene,
wherein the content of the polymer block (A) in the block copolymer is from 1 to 12% by mass; and
when the polymer block (B) is regarded as having a structure with a hydrogenation rate of 100 mol %, an average value of a methylene chain length of a main chain of the structural unit derived from at least one selected from the group consisting of a conjugated diene compound and isobutylene is from 1.0 to 6.0;
wherein
a weight average molecular weight (Mw) of the polymer block A is from 3,000 to 60,000,
a weight average molecular weight of the polymer block B is from 130,000 to 450,000,
a weight average molecular weight (Mw) of the hydrogenated block copolymer is from 133,900 to 800,000, and a bonding mode of the polymer block (A) and the polymer block (B) is selected from the group consisting of A-B, A-B-A, B-A-B, A-B-A-B, A-B-A-B-A, B-A-B-A-B and (A-B)$_n$-X wherein A represents polymer block (A), B represents polymer block (B), n is an integer of 3 or more and X represents a coupling agent residue, and a morphology of a film having a thickness of 1 mm, which is obtained by molding the copolymer under the following molding condition, has a microphase-separated structure of a sphere:

Molding condition: to apply a pressure at a temperature of under a pressure of 10 Mpa for 3 minutes, wherein at least one of the plural Y layers is a layer comprising a thermoplastic resin (i) different from the hydrogenated block copolymer, and the thermoplastic resin (i) is an ionomer.

2. The laminate according to claim 1, which is a laminate of a glass layer, a layer containing the thermoplastic resin (i), the X layer, a layer containing the thermoplastic resin (i), and a glass layer in the order listed.

3. The laminate according to claim 1, wherein the X layer is laminated between at least two Y layers, and which satisfies formula (I):

$$200 \leq (\text{peak top frequency of } \tan\delta) \times \sqrt{B/m} \leq 2{,}000{,}000 \quad (I)$$

wherein:

B represents a bending stiffness (P·m$^3$) per unit width of the laminate;

m represents a surface density (kg/m$^2$) of the laminate; and the peak top frequency (Hz) of tan δ represents a frequency when a peak of tan δ of the hydrogenated block copolymer determined according to the following method becomes maximum:

Measurement method of peak top frequency of tan δ: by using a sheet-shaped test piece having a thickness of 1.0 mm, which is obtained by molding the copolymer according to the following molding condition, a master curve calculated by the WLF method is prepared on the basis of measured values as measured under a condition at a strain amount of 0.1%, a frequency of 1 to 100 Hz, and a measurement temperature of 20° C., 10° C., 0° C., −10° C., and −30° C., respectively in conformity of IN K7244-10 (2005), to determine the peak top frequency:

Molding condition: to apply a pressure at a temperature of 230° C. under a pressure of 10 MPa for 3 minutes.

4. The laminate according to claim 1, wherein at least one of the plural Y layers is a glass layer.

5. The laminate according to claim 1, wherein the hydrogenation rate in the polymer block (B) is from 80 to 99 mol %.

6. The laminate according to claim 1, wherein when the polymer block (B) has a structure with a hydrogenation rate of 100 mol %, and an average value of a substituent constant (v) of a side chain which the main chain has per ethylene unit is from 0.25 to 1:1.

7. The laminate according to claim 1, wherein the polymer block B comprises a conjugated diene compound and the conjugated diene compound is isoprene, butadiene or a mixture of isoprene and butadiene.

8. The laminate according to claim 1, wherein the average value of a methylene chain length of a main chain of the structural unit derived from the conjugated diene compound is from 1.5 to 3.0.

* * * * *